US012781442B2

(12) United States Patent
Hausmann et al.

(10) Patent No.: US 12,781,442 B2
(45) Date of Patent: *Nov. 3, 2026

(54) MOLD BODY WITH VARYING THICKNESS FOR A PRE-PRESSING TOOL, AND PRE-PRESSING TOOL

(71) Applicant: Kiefel GmbH, Freilassing (DE)

(72) Inventors: Matthias Hausmann, Unken (AT); Werner Steinbacher, Piding (DE); Josef Rehrl, Teisendorf (DE); Hubert Rehrl, Teisendorf (DE); Marcel Boxleitner, Abtenau (AT); Thomas Schickmaier, Kremsmünster (AT)

(73) Assignee: Kiefel GmbH, Freilassing (DE)

( * ) Notice: Subject to any disclaimer, the term of this patent is extended or adjusted under 35 U.S.C. 154(b) by 196 days.

This patent is subject to a terminal disclaimer.

(21) Appl. No.: 18/610,480

(22) Filed: Mar. 20, 2024

(65) Prior Publication Data

US 2024/0218607 A1 Jul. 4, 2024

Related U.S. Application Data

(63) Continuation-in-part of application No. 17/754,791, filed as application No. PCT/DE2020/000230 on Oct. 1, 2020, now Pat. No. 12,071,731.

(30) Foreign Application Priority Data

Oct. 14, 2019 (DE) ..................... 10 2019 127 562.8
Oct. 6, 2023 (DE) ..................... 20 2023 105 781.9
(Continued)

(51) Int. Cl.
*D21J 7/00* (2006.01)
*B30B 15/06* (2006.01)

(52) U.S. Cl.
CPC .............. *D21J 7/00* (2013.01); *B30B 15/062* (2013.01)

(58) Field of Classification Search
CPC ................................ D21J 7/00; B30B 15/062
See application file for complete search history.

(56) References Cited

U.S. PATENT DOCUMENTS 2,079,667 A * 5/1937 Swift, Jr. .................. D21J 3/00 162/383
2,980,183 A * 4/1961 Wells ........................ D21J 7/00 162/402
(Continued)

FOREIGN PATENT DOCUMENTS

CH 601559 A5 * 7/1978 ................ D21J 3/10
CN 1345392 A 4/2002
(Continued)

OTHER PUBLICATIONS

International Search Report and Written Opinion in PCT Appl. No. PCT/DE2020/000230 mailed Apr. 23, 2021, 15 pages.

*Primary Examiner* — Jose A Fortuna
(74) *Attorney, Agent, or Firm* — Kowert, Hood, Munyon, Rankin & Goetzel, P.C.; Gareth M. Sampson; Dean M. Munyon

(57) ABSTRACT

The present disclosure relates to a molding station a mold body for a pre-pressing tool that is utilized for pressing three-dimensional preforms made of a fiber-containing material. The mold body includes a deformable material and is perforated in some portions. In certain instances, the mold body has, with respect to a wall section and a floor section, a greater material thickness in a connection section for the pre-pressing tool.

20 Claims, 10 Drawing Sheets

(30) Foreign Application Priority Data

| | | |
|---|---|---|
| Oct. 6, 2023 | (DE) | 20 2023 105 782.0 |
| Oct. 6, 2023 | (DE) | 20 2023 105 783.7 |

(56) References Cited

U.S. PATENT DOCUMENTS

| | | | | |
|---|---|---|---|---|
| 6,576,089 | B1 * | 6/2003 | Sato | D21J 7/00 162/227 |
| 6,752,910 | B2 * | 6/2004 | Sato | D21J 5/00 162/405 |
| 6,860,461 | B1 * | 3/2005 | Otani | D21J 7/00 162/382 |
| 6,918,997 | B2 * | 7/2005 | Goto | D21J 3/10 264/87 |
| 7,067,041 | B2 * | 6/2006 | Tsuura | D21J 7/00 162/227 |
| 7,370,788 | B1 * | 5/2008 | Otani | B65D 1/0215 229/407 |
| 7,909,964 | B2 | 3/2011 | Nilsson et al. | |
| 8,246,784 | B2 | 8/2012 | Nilsson et al. | |
| 9,951,478 | B2 * | 4/2018 | Kuo | D21J 3/00 |
| 9,976,262 | B2 * | 5/2018 | Kuo | B30B 15/022 |
| 10,711,404 | B2 | 7/2020 | Sundblad et al. | |
| 10,801,164 | B2 * | 10/2020 | Andersson | D21J 5/00 |
| 11,291,253 | B2 | 4/2022 | Kuo et al. | |
| 11,365,518 | B2 * | 6/2022 | Hardacre | D21J 3/10 |
| 11,391,001 | B2 * | 7/2022 | Andersson | B22F 3/1109 |
| 12,071,731 | B2 | 8/2024 | Hagenauer et al. | |
| 12,297,602 | B2 * | 5/2025 | Pierce | B29C 33/02 |
| 2003/0051845 | A1 | 3/2003 | Gale et al. | |
| 2003/0111201 | A1 * | 6/2003 | Sato | D21J 5/00 162/405 |
| 2004/0241274 | A1 * | 12/2004 | Odajima | D21J 7/00 425/389 |
| 2011/0168346 | A1 | 7/2011 | Nilsson et al. | |
| 2017/0370049 | A1 | 12/2017 | Andersson et al. | |
| 2019/0376239 | A1 * | 12/2019 | Andersson | D21J 3/00 |
| 2022/0388201 | A1 | 12/2022 | Knoll et al. | |
| 2023/0243107 | A1 | 8/2023 | Hagenauer et al. | |
| 2023/0311375 | A1 * | 10/2023 | Neuhofer | B30B 15/34 264/40.1 |
| 2023/0313458 | A1 | 10/2023 | Neuhofer et al. | |
| 2024/0218597 | A1 * | 7/2024 | Hausmann | D21F 13/00 |
| 2024/0218606 | A1 * | 7/2024 | Hausmann | D21J 3/00 |
| 2024/0218607 | A1 * | 7/2024 | Hausmann | B30B 15/062 |
| 2024/0316855 | A1 | 9/2024 | van der Schans et al. | |
| 2024/0368844 | A1 | 11/2024 | Hagenauer et al. | |
| 2025/0034816 | A1 * | 1/2025 | Hausmann | D21J 3/00 |
| 2026/0160025 | A1 | 6/2026 | Hiney et al. | |

FOREIGN PATENT DOCUMENTS

| | | | | | |
|---|---|---|---|---|---|
| CN | 107109803 | A | | 8/2017 | |
| CN | 105369695 | B | | 11/2017 | |
| CN | 109415131 | A | | 3/2019 | |
| CN | 113272495 | A | * | 8/2021 | D21J 7/00 |
| DE | 102021114662 | | | 12/2022 | |
| DE | 202023105782 | U | * | 10/2023 | D21J 3/10 |
| DE | 102022111908 | A1 | | 11/2023 | |
| DE | 102024118514 | A | | 1/2026 | |
| EP | 1197596 | A1 | | 4/2002 | |
| EP | 1235462 | A4 | | 12/2007 | |
| EP | 1439264 | B1 | * | 6/2011 | D21J 7/00 |
| EP | 4101981 | A1 | | 12/2022 | |
| EP | 4257348 | A1 | * | 10/2023 | B30B 15/34 |
| EP | 4675042 | A1 | | 1/2026 | |
| EP | 4045712 | B1 | | 3/2026 | |
| JP | 2005002529 | A | * | 1/2005 | |
| KR | 20230112624 | A | * | 7/2023 | B29C 33/3814 |
| TW | 1816115 | B | | 5/2012 | |
| WO | 9317183 | A1 | | 9/1993 | |
| WO | 03035981 | A1 | | 5/2003 | |
| WO | 2006057610 | A3 | | 11/2006 | |
| WO | WO-2014019027 | A1 | * | 2/2014 | D21H 11/00 |
| WO | WO-2015056276 | A1 | * | 4/2015 | D21J 3/10 |
| WO | WO-2020041251 | A1 | * | 2/2020 | D21J 3/00 |
| WO | 2021073671 | A1 | | 4/2021 | |
| WO | 2021073672 | A1 | | 4/2021 | |
| WO | 2021073673 | A2 | | 4/2021 | |
| WO | 2021073674 | A3 | | 6/2021 | |
| WO | WO-2023217540 | A1 | * | 11/2023 | D21J 7/00 |

* cited by examiner

MOLD BODY WITH VARYING THICKNESS FOR A PRE-PRESSING TOOL, AND PRE-PRESSING TOOL

PRIORITY CLAIM

The present application is a continuation-in-part of U.S. application Ser. No. 17/754,791, entitled "FIBRE MOULDING PLANT FOR PRODUCING MOULDED PARTS FROM ENVIRONMENTALLY DEGRADABLE FIBRE MATERIAL," filed Apr. 12, 2022, which is a 371 filing of International Patent Appl. PCT/DE2020/000230, filed Oct. 1, 2020, and claims priority to German Patent Application No. DE 10 2019 127 562.8, filed Oct. 14, 2019, the disclosures of which are incorporated by reference herein in their entirety. The present application also claims priority under 35 U.S.C. § 119 to German Patent Application No. DE 20 2023 105 781.0, filed Oct. 6, 2023, German Patent Application No. DE 20 2023 105 782.9, filed Oct. 6, 2023, and German Patent Application No. DE 20 2023 105 783.7, filed Oct. 6, 2023, the disclosures of which are incorporated by reference herein in their entirety.

TECHNICAL FIELD

Embodiments described herein relate to a mold body for a pre-pressing tool for pressing three-dimensional preforms made of a fiber-containing material and a pre-pressing tool having at least one mold body for pressing three-dimensional preforms made of a fiber-containing material.

BACKGROUND

Fiber-containing materials are increasingly used, for example, to produce packaging for food (e.g., trays, capsules, boxes, etc.) and consumer goods (e.g., electronic devices, etc.) as well as beverage containers. Everyday items, such as disposable cutlery and tableware, are also made from fiber-containing material. Fiber-containing materials may contain natural fibers or artificial fibers. Recently, fiber-containing material is increasingly used that has or is made of natural fibers which can be obtained, for example, from renewable raw materials or waste paper. The natural fibers are mixed in a so-called pulp with water and optionally further additives, such as starch. Additives can also have an effect on color, barrier properties and mechanical properties. This pulp can have a proportion of natural fibers of, for example, 0.1 to 10 wt. %. The proportion of natural fibers varies depending on the method used for the production of packaging etc. and the product properties of the product to be produced.

SUMMARY

An object of the present disclosure is to provide a manufacturing method for environmentally-friendly formed parts made of natural fibers and a corresponding machine with which these products (formed parts) can be produced effectively, flexibly and with good quality in a reproducible manner.

According to a first aspect of the present disclosure, an object is achieved by a molding station for a fiber-forming system for molding a formed part made from environmentally-friendly-degradable fiber material in a fiber-forming process, comprising

- a suction tool for sucking the environmentally-friendly degradable fiber material for molding the formed part from a reservoir with a pulp as a liquid solution with the environmentally-friendly degradable fiber material, wherein the suction tool comprises a suction head with a three-dimensionally shaped suction head suction side, which with its shape is adapted to a contour of the subsequent formed part, and the formed part is molded on the suction head suction side by means of a vacuum (suction pressure) in the suction tool; and
- a movement unit on which the suction tool is mounted, which is provided at least for placing or for partially immersing the suction tool on or in the pulp.

The term "environmentally-friendly-degradable fiber material" refers to fiber materials that can be decomposed by environmental factors such as moisture, temperature and/or light, with the decomposition process taking place in the short term, for example, in the range of days, weeks or a few months. For the sake of simplicity, the "environmentally-friendly-degradable fiber material" is below sometimes simply referred as "fiber material". Preferably, neither the fiber material nor the decomposition products should pose an environmental hazard or contamination. Fiber materials, which in the context of the present disclosure represent an environmentally-friendly-degradable fiber material, are, for example, natural fibers obtained from cellulose, paper, cardboard, wood, grass, plant fibers, sugar cane residues, hemp, etc. or from their components or parts thereof and/or correspondingly recycled material. However, environmentally-friendly-degradable fiber material can also refer to artificially produced fibers such as PLA (polylactide), etc., which correspond to the above fiber materials or have their properties. The environmentally-friendly-degradable fiber material is preferably compostable. The environmentally-friendly-degradable fiber material and the containers made from it are preferably suitable for introduction into the material cycle of the German organic compost bin and as a resource for biogas plants. The fiber materials and the containers made from them are preferably biodegradable in accordance with EU standard EN 13432.

The term "pulp" refers to fluid masses that contain fibers, here the environmentally-friendly-degradable fiber material. The term "liquid" refers here to the state of aggregation of the pulp, the liquid pulp comprising the environmentally-friendly-degradable fiber material in the form of fibers (liquid solution with the environmentally-friendly-degradable fiber material). The fibers can be present as individual fibers, as a fiber structure or as a fiber group composed of a number of connected fibers. The fibers represent the fiber material, regardless of whether they are in the pulp as individual fibers, as a fiber structure or as a group of fibers. The fibers are dissolved in the liquid solution in such a way that they float in the liquid solution as much as possible with the same concentration, regardless of location, for example, as a mixture or suspension of liquid solution and fiber material. For this purpose, for example, the pulp can be appropriately tempered and/or circulated in some embodiments. The pulp preferably has a low consistency, i.e., a proportion of fiber material of less than 8%. In one embodiment, a pulp with a proportion of environmentally-friendly, degradable fiber material of less than 5%, preferably less than 2%, particularly preferably between 0.5% and 1.0%, is used in the method described herein. This small proportion of fiber material can, among other things, prevent clumping of the fiber material in the liquid solution, so that the fiber material can still be molded onto the suction tool with good quality. Clumped fiber material can be sucked in by the suction tool, but would probably result in a formed part with a fluctuating layer thickness, which should be avoided in the production of the formed parts, if possible. In this respect, the proportion of fiber material in the pulp should be small enough so that clumping or chaining does not occur or occurs only to a negligible extent. The liquid solution can be any solution suitable for the fiber-forming process. For example, the pulp can be an aqueous solution containing the environmentally-friendly, degradable fiber material. An aqueous solution is, among other things, an easy-to-handle solution.

The fiber-forming process refers to the process steps that are involved in forming the formed part, beginning with providing the pulp, molding the formed part from the fiber material from the pulp in the molding station, preforming the formed part in the preforming station, hot-pressing the formed part in the hot-pressing station and optionally coating the formed part with functional coatings, wherein the coating can be arranged at any point in the fiber-forming process that is suitable for the respective coating to be applied.

The formed parts can have any shape, also referred to here as a contour, provided this shape (or contour) can be produced in the method described herein or the method is suitable for producing this shape (or contour). The components used for the fiber-forming process can be adapted to the respective shape (or contour) of the formed part. In the case of different formed parts with different shapes (or contours), different correspondingly adapted components such as the suction tool, the suction head, the prepressing station, the hot-pressing station, etc. can be used. The target contour of the formed part and thus the corresponding shaping components is preferably designed in such a way that all surfaces of the formed part have an angle $\alpha$ of at least 3 degrees to the pressing direction during hot-pressing. For example, a surface perpendicular to the pressing direction (maximum pressure) has an angle $\alpha=90$ degrees. This ensures that the hot-pressing pressure can be applied to all surfaces of the formed part. No pressure can be applied to surfaces parallel to the direction of pressure during hot-pressing. Final-shaped formed parts can represent a wide variety of products, for example, cups, containers, vessels, lids, bowls, portion containers, casings or containers for a wide variety of purposes.

The suction tool refers here to the tool in which the suction head or heads are arranged for molding the formed part. With a single suction head, this is also the suction tool. If there are several suction heads that are operated simultaneously, they are all arranged in the common suction tool, so that when the suction tool is moved, the individual suction heads in the suction tool are also moved. The supply of media to the suction tool with a plurality of suction heads is routed in a suitable manner to the individual suction heads in the suction tool.

Placing the suction tool on the pulp means that all of the suction heads provided in the suction tool for the molding of formed parts at least come into contact with the pulp, in such a way that, due to the vacuum or suction pressure applied to the pulp with the suction tool, the fiber material is pulled out of the pulp or the pulp with fiber material dissolved therein is sucked in. During the partial immersion into the pulp, the suction tool is not only placed on the pulp, but immersed into it. The immersion depth of the suction tool in the pulp depends on the respective application and the respective fiber-forming process and can differ depending on the application and possibly the formed part to be formed.

The suction head can have a negative form. A negative form is a form where the suction side of the suction head, i.e., the side where the fiber material is deposited due to the suction effect of the suction head and thus molds the formed part, is on the inside of the suction head, so that this inside, after the suction head has been placed on the pulp or the suction head has been immersed in the pulp, forms a cavity into which the pulp with the fiber material is sucked (as shown in FIG. 1). In the case of a negative form, the outside of the subsequent formed part faces the inside of the suction head. After molding, the formed part therefore sits on the inside of the suction head.

The suction head can also have a positive form. A positive form is a form where the suction side of the suction head, i.e., the side where the fiber material is deposited due to the suction effect of the suction head and thus forms the formed part, is on the outside of the suction head, so that this outside after the suction head has been placed on the pulp or the suction head has been immersed in the pulp, does not form a cavity (as shown in FIG. 1). In the case of a positive form, the inside of the subsequent formed part faces the outside of the suction head. After molding, the formed part therefore sits on the outside of the suction head.

The molding of the formed part refers to a first preforming of the formed part, whereby this formed part is formed from fiber material formerly randomly distributed in the pulp by means of accumulation of the fiber material on the contour of the suction head with the corresponding contour. The molded formed part still has a large proportion, for example, 70%-80%, of liquid solution, for example, water, and is therefore not yet dimensionally stable.

By means of the molding station, a formed part is easily molded from a pulp with a fiber material, which can very flexibly deliver formed parts with a wide variety of contours, depending on the configuration of the contour of the suction head. The ratio of width or diameter to height of the formed part does not represent a limiting or critical parameter for the quality of the production of the respective formed part. The molding station described herein makes it possible to produce the formed parts in a very reproducible manner and with great accuracy and quality with regard to the shape and layer thickness of the individual formed part sections. The molding station is able to process fibers of all kinds, as long as they can be dissolved in such a way that extensive clumping of the fibers in the liquid solution can be avoided before processing. In particular, this way, stable formed parts can be produced easily, effectively and flexibly from environmentally-friendly-degradable fiber material with good quality and good reproducibility.

The molding station described herein thus enables, together with subsequent forming steps described herein, the production of environmentally-friendly formed parts from natural fibers in an effective, flexible and reproducible manner with good quality.

In a further embodiment, the suction head suction side of the suction head is formed by a porous screen on a suction side surface of the suction head, wherein, on the pulp side of the screen facing the pulp, the environmentally-friendly-degradable fiber adheres due to the suction. The screen must have a porosity such that the pulp together with the fiber material can be sucked through the screen and the liquid solution of the pulp can pass through the screen. However, the porosity of the screen must not be too large so that the fiber material can adhere to the pulp side.

In a further embodiment, the screen has a wavy structure with wave crests and wave troughs along the suction-side surface, wherein the screen rests at least during suction with the wave crests of its side facing the suction-side surface on the suction-side surface. As a result, the screen is mechanically supported in a simple manner during molding so that its shape does not change and therefore a reproducible shape of the formed part is ensured and on the other hand it can be made porous enough to ensure good suction behavior of the pulp.

In a further embodiment, the suction tool comprises a plurality of suction channels which terminate on the suction-side surface below the screen and are distributed over the suction-side surface in such a way that essentially the same suction power is enabled in all areas between the screen and the suction-side surface. Due to the plurality of suction channels, it is possible, among other things, to suck in pulp with fiber material over the entire surface of the screen, so that the formed part can mold itself on the surface of the screen. The term "substantially" refers here to a homogeneity of the suction power that is sufficient to achieve a uniformly molded formed part without significant layer thickness variations at the corners and edges of the formed part and over the surfaces of the formed part. As a result, the resulting molded formed part has a layer thickness variation of less than 7% from the desired layer thickness. In a further embodiment, the suction channels have openings in the suction-side surface with diameters of less than 4 mm.

In a further embodiment, the suction channels have an uneven distribution on the suction-side surface, with 40%-60% fewer suction channels in the area of negative edges in the formed part and/or 10%-30% more suction channels per unit area in the area of positive edges are arranged than on plane surfaces. As a result of this lower or higher density of suction channels in the area of edges (here refers to all corners and edges, indentations and more significant contour changes in the formed part, negative or positive edges refer to the contour as inner or outer edges), excess or shortage of material in the area of the edges relative to other material thicknesses on surfaces without edges are avoided.

In a further embodiment, the screen is fastened in the suction head only with reversible fastening means, preferably clamping means. As a result, the screens can be quickly and easily removed from the suction tool for cleaning processes or exchanged if necessary. This exchange is also favored, among other things, by the fact that the screen is already supported by it resting on the suction-side surface, which avoids additional brackets. In a further embodiment, the screen is fastened in at least some of the suction channels, if necessary.

In a further embodiment, the suction head comprises, on its end face facing the pulp, a collecting ring for receiving the liquid solution of the pulp sucked through the suction side of the suction head, which collecting ring is connected to a discharge channel for the liquid solution. Among other things, the liquid solution that has passed through the screen can be safely removed from the suction head and thus from the suction tool, so that this liquid solution does not negatively influence the suction power of the suction head.

In a further embodiment, the suction head suction side of the suction head is represented either as a negative form, the suction head inside, or as a positive form, the suction head outside. With regard to the terms "negative form" and "positive form", reference is made to the explanations above. Depending on the desired shape or contour of the formed part and the further processing, negative forms or positive forms of the suction head can be advantageous.

In a further embodiment, the suction tool is a multi-tool with a plurality of suction heads. With a multi-tool, a plurality of formed parts can be formed simultaneously from a common pulp bath according to the number of suction heads, which increases the throughput of the fiber-forming system and thus allows the fiber-forming system to produce more economically.

In a further embodiment, the shapes of the suction heads in the suction tool can differ at least in part, preferably the same shapes of the suction heads are arranged adjacently in the suction tool. The different shapes can, for example, be arranged in modules in the suction tool. Such a suction tool is able to produce different formed parts simultaneously in the same fiber-forming process. For example, vessels such as cups and the associated lids can be simultaneously formed and further processed in the same suction tool.

In a further embodiment, the suction tool comprises a base plate with suction heads mounted thereon and a gas line system in the base plate, which distributes at least the vacuum provided by a vacuum pump to the suction heads for sucking in the fiber material. The base plate can be connected to the movement unit in a simple and standardized way, while the suction heads mounted on it can differ depending on the desired formed part. The base plate enables the suction heads to be exchanged quickly, if necessary. The vacuum pump can be positioned at a location remote from the suction tool and can distribute the vacuum generated to the suction heads via the gas line system.

In a further embodiment, the gas line system also includes compressed gas lines for applying compressed air to the suction heads. The formed parts can be ejected from the suction tool by a blast of compressed air, for example, after they have been transferred to a hot-pressing lower tool.

In a further embodiment, the gas line system for the vacuum comprises main gas lines and secondary gas lines, wherein the main gas lines are provided for generating a pre-vacuum and the secondary gas lines are provided as a supplement to the main gas lines for achieving the suction vacuum after the suction tool has come into contact with the pulp. In this way, a large volume of gas can be pumped out quickly in order to have a vacuum applied on the suction heads. The process vacuum required for the molding of the formed part can then be quickly adjusted via the suction power on the secondary gas lines, which represent additional pump-out lines to the main lines.

In a further embodiment, one or more valves are suitably arranged in the gas line system to switch off at least one suction pressure at the suction heads as soon as the suction tool has left the pulp and/or to switch on at least the secondary gas lines in addition to the main lines as soon as the suction tool is immersed in the pulp. As a result, the molding process can be made faster and more economical, among other things.

In a further embodiment, the movement unit comprises a robotic arm that can move freely in space and on which the suction tool is mounted. As a result, the molding station can easily and flexibly supply one or more preforming stations and/or one or more hot-pressing stations with molded or preformed formed parts. Thus, the manufacturing process can be accelerated or modified depending on the required production rate, among other things. In a further embodiment, the movement unit is therefore intended to transfer the formed parts in the suction tool to the prepressing station of a preforming station and/or to the hot-pressing station.

In a further embodiment, the robotic arm is connected to the suction tool with a suitable interface that comprises all media supply connections for the suction tool. This means that standardized suction tools can be used, which enable a quick exchange, if necessary.

In a further embodiment, the movement unit is provided for completely immersing the suction head or suction heads into the pulp for contact. Complete immersion is particularly suitable for a suction head as a positive form, since here, in contrast to a negative form; there is no internal cavity in the suction head in which suction pressure (vacuum) can be generated between the pulp and the suction side to suck in the fiber material. In order to ensure that the fiber material is sucked up as evenly as possible, it is advantageous, with a positive form, to completely immerse the suction head in the pulp.

In a further embodiment, the movement unit and the suction tool are configured to leave the molded formed parts in the prepressing station for prepressing in the suction tool after the transfer to the preforming station.

Since the formed part is still relatively moist when it is molded in the suction head and therefore not very dimensionally stable, it is advantageous for a fault-free and qualitatively good process to leave the formed part in the suction head at least until the completion of the prepressing to avoid tool changes for the formed part that could damage its shape. Since the suction tool is the prepressing upper tool in the preforming station, this also speeds up the preforming process.

In a further embodiment, the movement unit and the suction tool are configured to eject the molded formed parts in the hot-pressing station from the suction tool for the subsequent hot-pressing. This can be done, for example, by means of a pressure surge on the preformed formed parts in the suction tool, so that the formed parts can be quickly transferred to the hot-pressing station. In a further embodiment, the movement unit and the suction tool are therefore configured to eject the formed parts from the suction heads of the suction tool using compressed air.

According to a second aspect of the present disclosure, the object is achieved by a preforming station for a fiber-forming system for preforming a formed part from environmentally-friendly-degradable fiber material in a fiber-forming process, comprising

- a reservoir with a pulp as a liquid solution with the environmentally-friendly-degradable fiber material for molding (in the molding station described herein) the formed part, preferably arranged as a horizontal reservoir open at the top; and
- a prepressing station for preforming the formed part molded by means of a molding station according to one of the preceding claims by means of a suction tool with a prepressing pressure to reduce a portion of the liquid solution in the formed part and to stabilize the shape of the formed part.

The pulp can contain no organic binder, preferably also no non-organic binder. Without a binder, the formed parts produced from originally environmentally-friendly-degradable fiber material are degradable in a particularly environmentally-friendly manner, since no environmentally-critical binder, preferably no binder at all, is used. The elimination of binders is made possible by the combination of molding, preforming and hot-pressing steps, which as a whole ensure good mechanical interlinking of the individual fibers with one another in the fiber material of the formed part. In the process described herein, the mechanical interlinking is so strong that for the dimensional stability of the formed part binders can be dispensed with. In one embodiment, the environmentally-friendly-degradable fiber material essentially consists of fibers with a fiber length of less than 5 mm. With fibers of this length, one obtains, among other things, a good, homogeneous solution of the fiber material in the liquid solution, so that the degree of clumping of the fibers in the pulp is sufficiently low for a good, reproducible fiber-forming process for the formed part. In one embodiment, the pulp is provided at a temperature of less than or equal to 80° C., preferably less than or equal to 50° C., particularly preferably at room temperature. These low temperatures allow, among other things, a simple process control, especially at room temperature. At higher temperatures, the hot-pressing process can be slightly accelerated.

By means of the preforming station, a preformed part that is sufficiently stable for further processing and has a further reduced proportion of liquid solution is produced in a simple manner from a mechanically still unstable part by means of prepressing. Here, too, the ratio of the width or diameter to the height of the formed part does not represent a limiting or critical parameter for the quality of the production of the respective formed parts. The preforming station described herein makes it possible to produce and further process the formed parts in a very reproducible manner and with great accuracy and quality with regard to the shape and layer thickness of the individual formed part sections. In one embodiment, the prepressing can be performed at a temperature of the prepressing station of less than 80° C., preferably less than 50° C., particularly preferably at room temperature. The prepressing reduces the liquid content in the formed part to approx. 55%-65% and the formed part is pre-solidified in such a way that it is sufficiently dimensionally stable for tool transfer. Too high a temperature would lower the liquid content in the formed part too much, which would make the material too stiff for the subsequent hot-pressing. It is exactly the combination of prepressing and hot-pressing that enables the reproducible production of good-quality formed parts with a low level of rejects. In another embodiment, the prepressing is performed at the prepressing pressure between 0.2 $N/mm^2$ and 0.3 $N/mm^2$, preferably between 0.23 $N/mm^2$ and 0.27 $N/mm^2$. These moderate pressures, which are lower than the hot-pressing pressure, enable gentle solidification of the formed part with a moderate reduction in liquid, which is advantageous for a low-waste hot-pressing process.

In particular, this way, stable formed parts can be produced easily, effectively and flexibly from environmentally-friendly-degradable fiber material with good quality and good reproducibility.

The preforming station described herein, together with preceding and subsequent forming steps described herein, thus makes it possible to produce environmentally-friendly formed parts from natural fibers in an effective, flexible and reproducible manner with good quality.

In one embodiment, the preforming station further comprises a pulp preparation and replenishment unit for replenishing the pulp for the reservoir. In this way, the pulp can be fed to the reservoir with controlled quality and constant concentration as it is consumed by molding. The liquid solution discharged during molding can thus be returned to the reservoir after processing, for example, by adding fiber material to set the desired concentration of fiber material in the pulp, and can thus be reused in the fiber-forming process. In a further embodiment, the pulp preparation and replenishment unit therefore fills the reservoir at least periodically, preferably continuously, depending on the pulp consumed by molding the formed part, in order to ensure that the reservoir is filled to the required level for molding.

In a further embodiment, the prepressing station is arranged and configured relative to the reservoir in such a way that the liquid solution removed from the formed part by the prepressing is fed back into the reservoir. In this way, pulp consumption can be reduced. In a further embodiment, the prepressing station is arranged in a vertical alignment thereto above the reservoir, so that the liquid solution removed from the formed part by the prepressing flows back into the reservoir from the prepressing station directly into the reservoir. Alternatively, the liquid solution flows back into the reservoir after preparation by the pulp preparation and replenishment unit of the preforming station.

In a further embodiment, the prepressing station comprises a prepressing lower tool, the shape of which is adapted to the formed part remaining in the suction tool in such a way that it can be placed on the prepressing lower tool in such a way that it is arranged between the prepressing lower tool and the suction tool, so that the suction tool can be pressed onto the prepressing lower tool with prepressing pressure. The suction tool can be pressed onto a stationary prepressing lower tool or the prepressing lower tool is pressed onto a stationary suction tool. The term "place" only refers to the relative movement of the suction tool to the prepressing lower tool. During prepressing, the suction tool represents the prepressing upper tool of the prepressing station. In one embodiment, the suction tool is placed on the prepressing lower tool and pressed onto the prepressing lower tool by means of a separate pressing unit, preferably a piston rod. Alternatively, the suction tool can also be attached to a robotic arm, which itself exerts the prepressing pressure on the prepressing lower tool via the suction tool. Analogously to a suction tool as a multi-tool, the prepressing station can also be designed as a multi-tool with a plurality of prepressing lower tools adapted to the suction tool as a multi-tool in order to apply the prepressing pressure to all molded formed parts of the suction tool simultaneously and thus the carry out the prepressing for all formed parts simultaneously. Alternatively, the prepressing can be performed as membrane pressing, wherein the prepressing lower tool is designed as a flexible membrane and the prepressing pressure is applied to the membrane as gas pressure, which membrane is then pressed onto the outer contour of the formed part. Membrane pressing is particularly suitable for geometries of the formed part where pressure is to be exerted on a large area. Membrane pressing can also be used to simultaneously apply the same pressure to surfaces that are perpendicular to one other in any spatial orientation, since in membrane pressing the prepressing pressure is generated by means of gas pressure, for example, by means of compressed air, which acts on the membrane irrespective of the direction. This would not be possible with a pressure piston rod, for example. Rubber membranes, for example, can be used as membranes. The membrane should have a contour fidelity of less than 20% and can be designed differently locally, for example, with thinner and thicker walls and/or arranged closer to the contour or further away from it.

In a further embodiment, the prepressing lower tool has a pressing surface facing the formed part, the pressing surface having a lower surface roughness than the screen. As a result, homogeneous pressure is exerted on the formed part. In addition, the adhesion between the prepressing lower tool and the formed part is lower than with structured surfaces of the prepressing lower tool, which ensures that the prepressed formed parts remain in the suction tool for transfer to the hot-pressing station without further technical measures and do not remain on the prepressing lower tool, which would cause a disruption in the production process. If necessary, the suction tool can generate a suitable vacuum in the suction tool for the transfer of the prepressed formed parts to the hot-pressing station in order to improve the adhesion of the formed parts to the suction tool.

In a further embodiment, the prepressing lower tool is made of metal or at least partially made of elastomer, preferably made of silicone. Metal prepressing lower tools are particularly suitable for cases where a temperature above room temperature or a particularly high prepressing pressure is to be applied during prepressing. Prepressing lower tools made of an elastomer or at least partly made of elastomer are advantageous for multi-tools as suction tool and prepressing lower tool, since the elastomer can still be easily deformed under pressure and thus adapts flexibly to a multi-suction tool that may bend under the prepressing pressure and thus improves the homogeneity of the shaping of the various formed parts in the multi-suction tool. For increased prepressing temperatures below 100° C., for example, silicone as an elastomer is also well suited as a temperature-resistant material in this range.

In a further embodiment of prepressing lower tools, at least partially made of elastomer, said prepressing lower tools have a cavity which is surrounded by a wall made of the elastomer as a pressing surface, wherein the prepressing station is configured to apply gas pressure to the cavity during prepressing in order to generate the prepressing pressure or at least support it. This "inflating" of the prepressing lower tool allows it to conform particularly well to the contour of the formed part, so that the quality of the preforming process is improved, particularly for the reproducible production of very identical formed parts.

In a further embodiment, the prepressing lower tools are arranged on a common carrier plate, which is configured as an interface to the prepressing station for reversible attachment to the prepressing station and/or for supplying the individual prepressing lower tools with gas pressure. Among other things, this means that the prepressing lower tool can also be quickly exchanged as a multi-tool if required.

In a further embodiment, the carrier plate additionally comprises a heating element, preferably a heating element extending over the surface of the carrier plate, for heating the lower prepressing tools. This modular structure facilitates the handling of the components and their exchangeability.

In a further embodiment, the molding station is part of the preforming station. As a result, the molding station can be connected to the preforming station via suitable lines in such a way that the liquid solution and/or fiber material that has passed through the suction head is fed back into the pulp via the preforming station.

In a further embodiment, the suction tool having the negative form as the suction head suction side is placed on the prepressing lower tool (with a corresponding positive form) or having the positive form as the suction head suction side is inserted in the prepressing lower tool (as a corresponding negative form).

The object is achieved according to a third aspect of the present disclosure by a hot-pressing station for a fiber-forming system for the final shaping of a formed part made of environmentally-friendly-degradable fiber material in a fiber-forming process, comprising a hot-pressing lower tool adapted to a contour of the formed part for receiving the formed part and a hot-pressing upper tool adapted accordingly to the formed part for placing onto or inserting into the formed part along a closing direction of the hot-pressing station, wherein the hot-pressing lower tool and/or the hot-pressing upper tool are provided for exerting a hot-pressing pressure on the formed part arranged between the hot-pressing lower tool and the hot-pressing upper tool during hot-pressing.

After prepressing has taken place, the preformed formed part is transferred to the hot-pressing station by means of the suction tool, with the formed part being removed from the suction tool for subsequent hot-pressing. The transfer is advantageous in that the hot-pressing is performed at a high temperature with a significantly higher pressure. If the formed part were to remain in the suction tool without being transferred for hot-pressing, the fiber material could get caught in the screen of the suction tool and, after hot-pressing, be removed from the suction tool only with difficulty, possibly only with damage. In addition, the screen could be damaged by the high pressure, so that the suction tool would then no longer be functional. The transfer can take place in such a way that the formed part or parts are transferred from the suction tool to the hot-pressing station either passively by depositing them or actively by means of an ejection pressure in the suction tool against the formed parts. With the hot-pressing of the prepressed formed part with a hot-pressing pressure, the formed part is final-shaped with a further reduction in the proportion of the liquid solution in the formed part, for example, to below 10%, preferably to approximately 7%, after which it is then stable and dimensionally stable. Preferably, the hot-pressing lower and upper tools are made of metal. The hot-pressing is performed at the hot-pressing pressure which is higher than the prepressing pressure, for example, at a hot-pressing pressure between 0.5 N/mm$^2$ and 1.5 N/mm$^2$, preferably between 0.8 N/mm$^2$ and 1.2 N/mm$^2$. The hot-pressing pressure can be applied for a pressing time of less than 20 s, preferably more than 8 s, particularly preferably between 10 and 14 s, even more preferably 12 s. The hot-pressing pressure is applied hydraulically to the hot-pressing station, for example, via a piston rod, which piston rod presses, for example, on the hot-pressing upper tool, which in turn presses on the stationary hot-pressing lower tool, with the formed part in between. The arrangement could also be reversed.

The hot-pressing station is a simple way of producing a preformed and still slightly variable formed part by means of hot-pressing a final-shaped formed part with a significantly reduced proportion of liquid solution for further processing. Here, too, the ratio of the width or diameter to the height of the formed part does not represent a limiting or critical parameter for the quality of the production of the respective formed parts. The hot-pressing station described herein makes it possible to produce and further process the formed parts in a very reproducible manner and with great accuracy and quality with regard to the shape and layer thickness of the individual formed part sections. In particular, it is possible in this way to produce end-stable formed parts in a simple, effective and flexible manner from environmentally-friendly-degradable fiber material with good quality and good reproducibility.

The hot-pressing station described herein, together with previous forming steps described herein, thus makes it possible to produce environmentally-friendly formed parts made of natural fibers in an effective, flexible and reproducible manner with good quality.

In one embodiment, in the case of a negative form of a suction tool, the hot-pressing lower tool also has a negative form and is provided as an inner tool, while the hot-pressing upper tool is placed on it as an outer tool for hot-pressing. In the case of a positive form of the suction tool, the hot-pressing lower tool also has a positive form and is provided as an outer tool, while the hot-pressing upper tool is inserted in the hot-pressing lower tool as an inner tool for hot-pressing. The two hot-pressing upper and lower tools can work together to apply high pressures at high temperatures to the formed part in between them.

In a further embodiment, the respective hot-pressing sides of the hot-pressing lower tool and the hot-pressing upper tool facing the formed part are heated by means of electric heating cartridges. Electric heating cartridges enable rapid heating of the hot-pressing lower tool and the hot-pressing upper tool when the tools are closed, after the tools have cooled down by opening the hot-pressing station to remove the final-shaped parts.

In a further embodiment, the heating cartridges in the hot-pressing lower tool and hot-pressing upper tool are configured and arranged in such a way that the hot-pressing sides are heated to temperatures greater than 150° C., preferably between 180° C. and 250° C. This means that the liquid (or moisture) in the formed part can be reduced quickly and reliably to below 10%.

In a further embodiment, the heating cartridges are controlled in such a way that the temperatures of the hot-pressing lower tool and the hot-pressing upper tool differ. Among other things, this gives the formed part a better surface, especially on the warmer side. Preferably, the hot-pressing upper tool has a higher temperature than the hot-pressing lower tool; the temperatures preferably differ by at least 25° C., preferably not more than 60° C., particularly preferably by 50° C.

In a further embodiment, the heating cartridges are arranged close to the contour of the formed part in the respective hot-pressing upper tools and hot-pressing lower tools. The heating cartridges that are close to the contour heat the hot-pressing side up to the process temperature more quickly, which speeds up the hot-pressing process. The respective hot-pressing upper tools and hot-pressing lower tools are preferably made of metal in order to support this by means of good heat conduction.

In a further embodiment, at least one heating cartridge with a first heating output is arranged in the inner tool, while a plurality of heating cartridges with second heating outputs are arranged in the outer tool around the hot-pressing side of the outer tool. With this arrangement, rapid heating is achieved with the smallest possible number of heating cartridges. For this purpose, the first heating output is preferably greater than the second heating output. In a further embodiment, in the case of a single heating cartridge in the inner tool, said heating cartridge is arranged centrally in the inner tool parallel to the closing direction, and/or in the case of several heating cartridges, said heating cartridges are arranged in the inner tool concentrically around the closing direction parallel to the hot-pressing side of the inner tool. In a further embodiment, a plurality of heating cartridges is arranged in the outer tool concentrically around the closing direction and parallel to the hot-pressing side of the outer tool.

In a further embodiment, the hot-pressing lower tools and/or the hot-pressing upper tools comprise a covering made of a thermally insulating material on the sides facing away from the formed part, to keep the process temperature as constant as possible and to keep the necessary heating output of the heating cartridges as low as possible.

In a further embodiment, the hot-pressing lower tool comprises channels on its hot-pressing side, with which the liquid solution can be at least partially discharged during hot-pressing. By reducing the liquid (or moisture) in the formed part from approx. 55%-60% to below 10%, a quantity of liquid is released, which at least partially evaporates due to the high temperatures during hot-pressing. This steam is discharged via the channels so that the formed part is not damaged by the steam, among other things. For this purpose, the channels preferably have a diameter of less than or equal to 1.0 mm, at least on the hot-pressing side.

In a further embodiment, both the hot-pressing lower tool and the hot-pressing upper tool are designed as a multi-tool with a plurality of hot-pressing lower tools and hot-pressing upper tools arranged on respective carrier plates for the respective hot-pressing lower tools and hot-pressing upper tools. In this way, after the transfer, the hot-pressing pressure can be applied to all preformed formed parts from the suction tool simultaneously, and the hot-pressing can thus be performed simultaneously for all formed parts.

In a further embodiment, the carrier plates in the hot-pressing station are laterally movably mounted to facilitate a tool change of the respective hot-pressing lower tools and hot-pressing upper tools as multi-tools outside of a process space of the hot-pressing station. This means that changes can be performed quickly and in a space-saving manner.

In a further embodiment, the carrier plate of the hot-pressing upper tools of the multi-tool is provided with gas lines in order to, depending on the process step, apply a vacuum in the respective hot-pressing upper tools to hold the formed parts in and/or an overpressure to eject the final-shaped formed parts from the hot-pressing upper tools.

In a further embodiment, expansion means are arranged between the carrier plate and a holder for the carrier plate to compensate for high temperatures and temperature fluctuations due to the opening and closing of the hot press station relative to the supports and other components.

In a further embodiment, thermally insulating material is arranged between the carrier plate and the holder in order to keep the process temperature as constant as possible and to keep the necessary heating output of the heating cartridges as low as possible.

The present disclosure also relates to a fiber-forming system for producing formed parts from environmentally-friendly-degradable fiber material, comprising at least a molding station described herein, a preforming station described herein, and a hot-pressing station described herein for producing a formed part from environmentally-friendly-degradable fiber material by means of a fiber-forming process performed in the fiber-forming system.

The combination of molding by means of pulp and a suction tool, prepressing by means of a preforming station, and hot-pressing by means of a hot-pressing station makes it easy to produce a formed part from a fiber material that, depending on the design of the contour of the suction head, can very flexibly deliver formed parts with a wide variety of contours. The ratio of width or diameter to height of the formed part does not represent a limiting or critical parameter for the quality of the production of the respective formed part. Through the combination of the suction tool for molding and the preforming and hot-pressing stations, the formed parts can be produced very reproducibly and with great accuracy and quality in terms of shape and layer thickness of the individual formed part sections. The fiber-forming system described herein is able to process fibers of the most varied types, provided that they can be dissolved in such a way that extensive clumping of the fibers in the liquid solution prior to processing can be avoided. In particular, this way, stable formed parts can be produced easily, effectively and flexibly from environmentally-friendly-degradable fiber material with good quality and good reproducibility.

The fiber-forming system described herein thus makes it possible to produce environmentally-friendly formed parts from natural fibers in an effective, flexible and reproducible manner with good quality.

In one embodiment, the fiber-forming system comprises a control unit for controlling at least the molding station, the preforming station and the hot-pressing station and their sub-components. The control unit can be designed as a processor, separate computer system or can be web-based and is suitably connected to the components of the fiber-forming system to be controlled, for example, via data cable or wirelessly using WLAN, radio or other wireless transmission means.

In a further embodiment, the fiber-forming system also comprises a coating unit for applying one or more functional coatings to the formed part. With such functional coatings, additional functionalities such as moisture, aroma, odor or taste barriers or barriers against fats, oils, gases such as O2 and N2, light acids and all substances that contribute to the perishability of food and/or non-food-grade substances are applied to the formed part. For this purpose, the coating unit can be arranged at any position in the process sequence for producing the formed part that is suitable for the coating to be applied. Depending on the application, the functional coating can be arranged in the suction process, after pre-pressing or after hot-pressing. The term "functional coating" refers here to any additional coating applied to the original fiber material that is applied both to an inner side and/or to an outer side of the formed part over the whole area or in partial areas.

In a further embodiment, the fiber-forming system additionally comprises an ejection unit for ejecting the final-shaped formed part. The ejection unit ejects the formed part for further transport or for further processing, for example, to subsequent cutting, inscribing, printing, stacking and/or packing stations, for example, with the aid of a conveyor belt.

The present disclosure also relates to a method for producing formed parts from environmentally-friendly-degradable fiber material by means of a fiber-forming process in a fiber-forming system described herein, comprising the following steps:

- molding the formed part in a molding station described herein from a reservoir with a pulp as a liquid solution with the environmentally-friendly-degradable fiber material;
- preforming the formed part in a preforming station described herein;
- final shaping the preformed part in a hot-pressing station described herein; and
- ejecting the final formed part from the fiber-forming system.

It should be expressly pointed out that, for the purpose of better readability, "at least" expressions have been avoided as far as possible. Rather, an indefinite article ("one", "two" etc.) is normally to be understood as "at least one, at least two, etc.", unless it follows from the context that "exactly" the specified number is meant there.

At this point it should also be mentioned that within the scope of the present patent application, the expression "in particular" is always to be understood in such a way that an optional, preferred feature is introduced with this expression. The expression is therefore not to be understood as "specifically" and not as "namely".

It goes without saying that features of the solutions described above or in the claims can also be combined if necessary in order to be able to cumulatively implement the advantages and effects that can be achieved here.

BRIEF DESCRIPTION OF THE FIGURES

In addition, further features, effects and advantages of the present disclosure are explained with reference to the attached drawing and the following description.

Components which at least essentially correspond in terms of their function in the individual figures are identified by the same reference signs, with the components not having to be numbered and explained in all figures.

In the figures:

Figure 1:
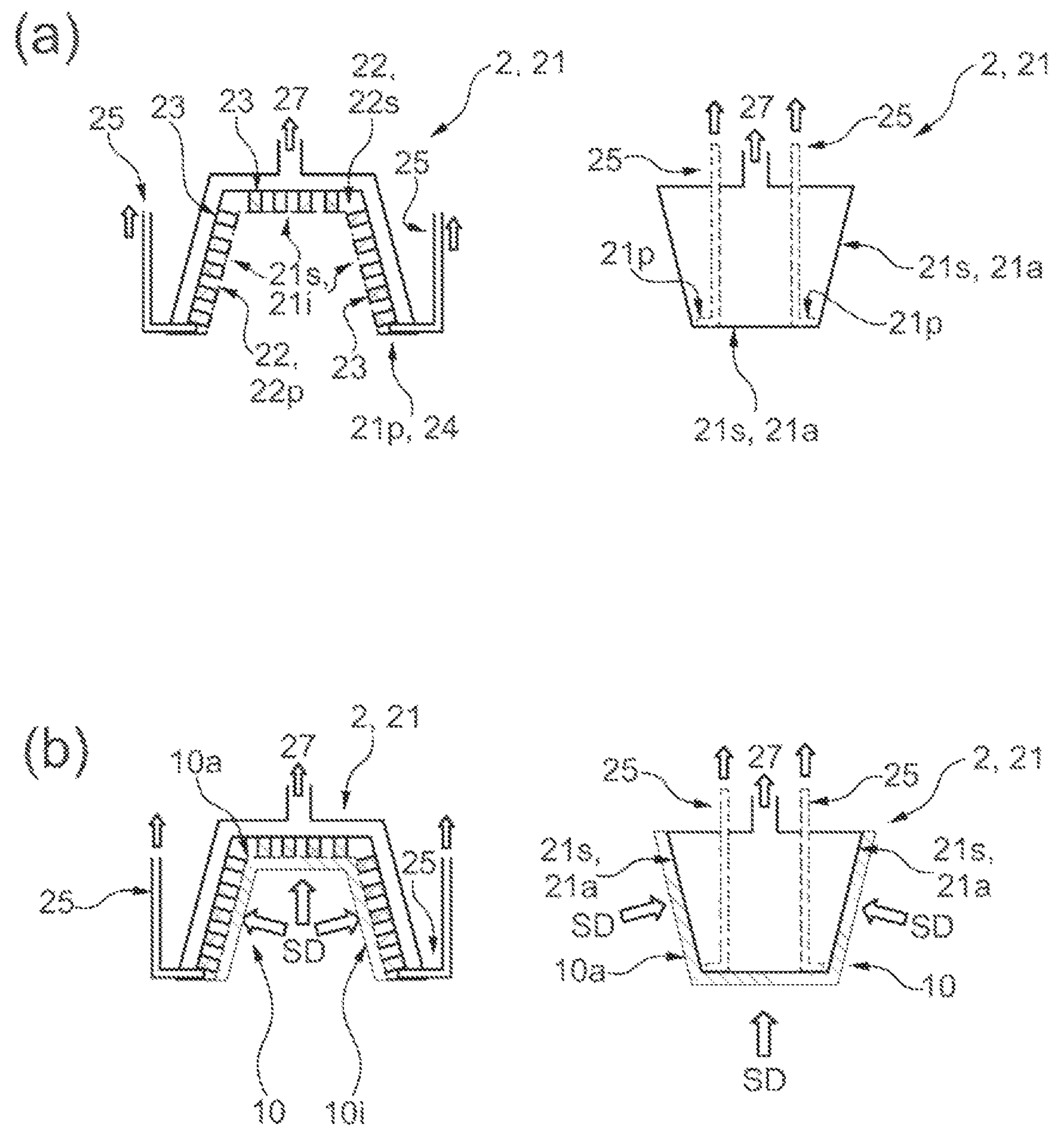
Figure 2:
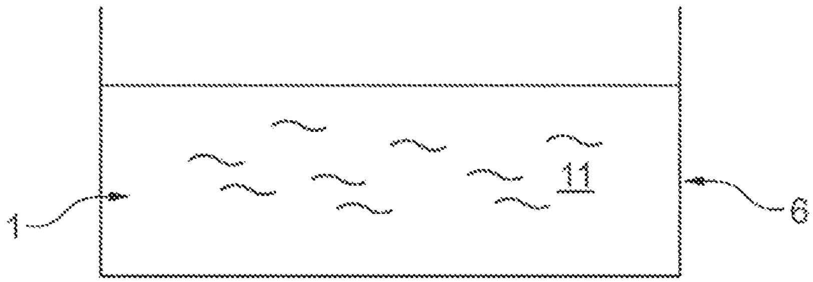
Figure 3:
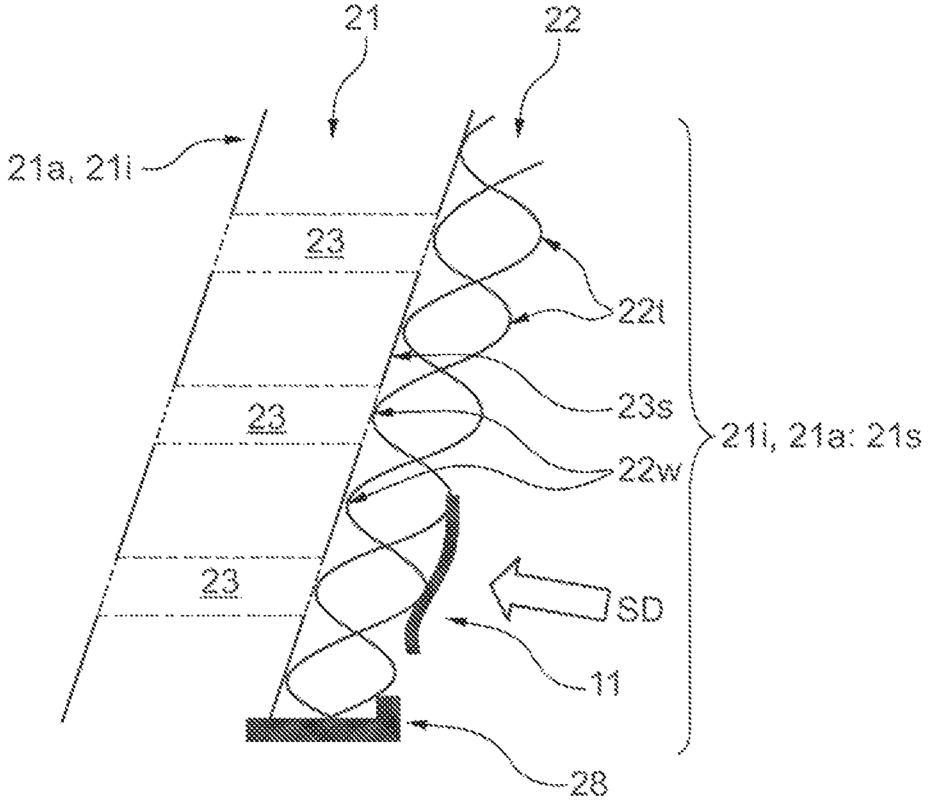
Figure 4:
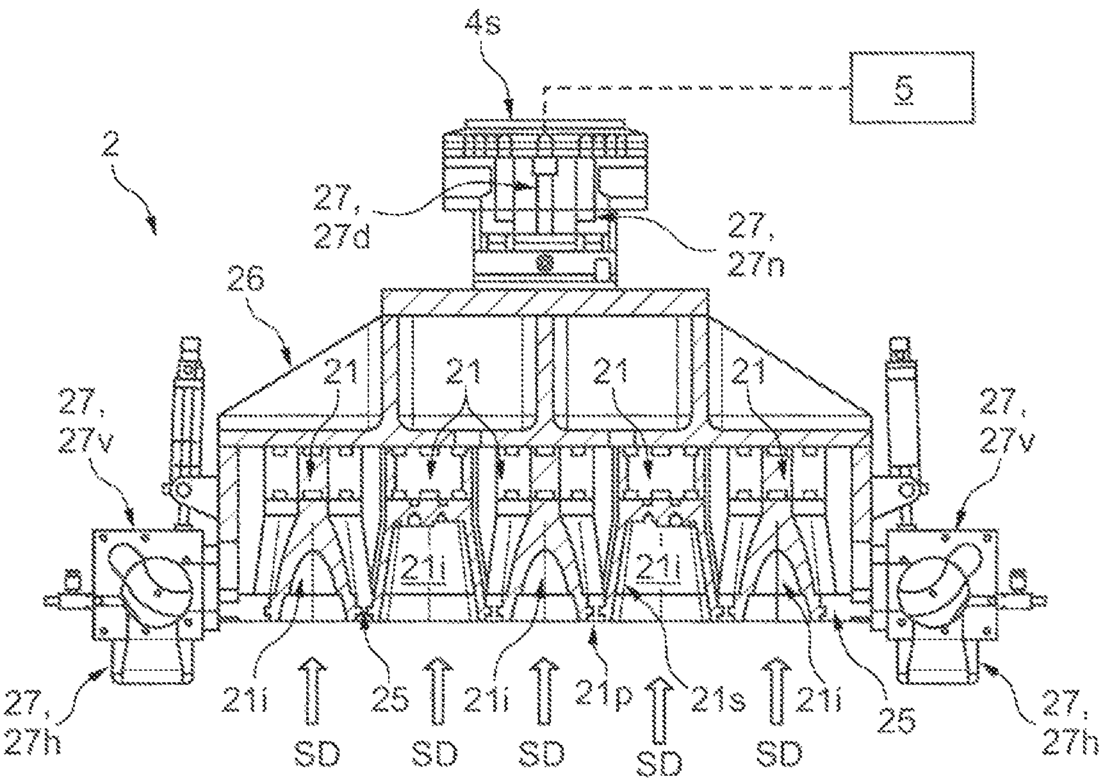
Figure 5:
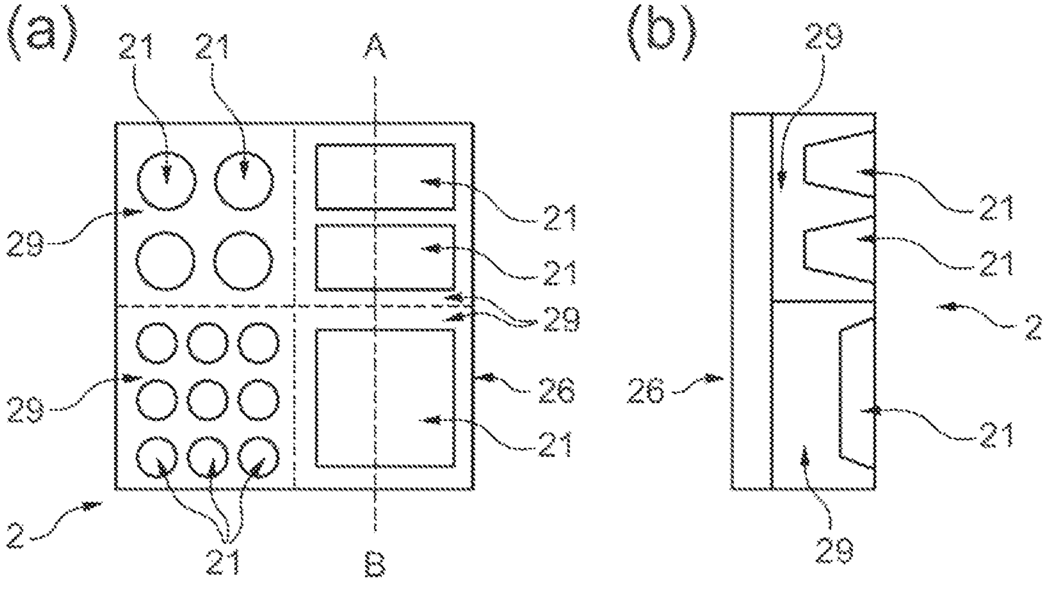
Figure 6:
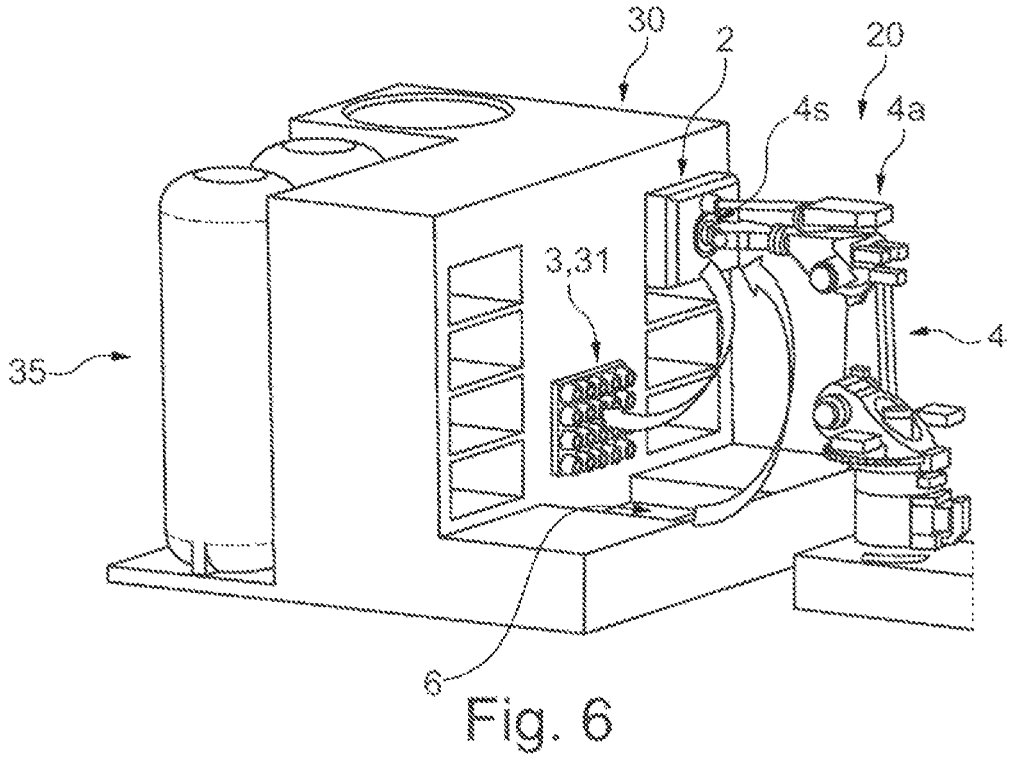
Figure 7:
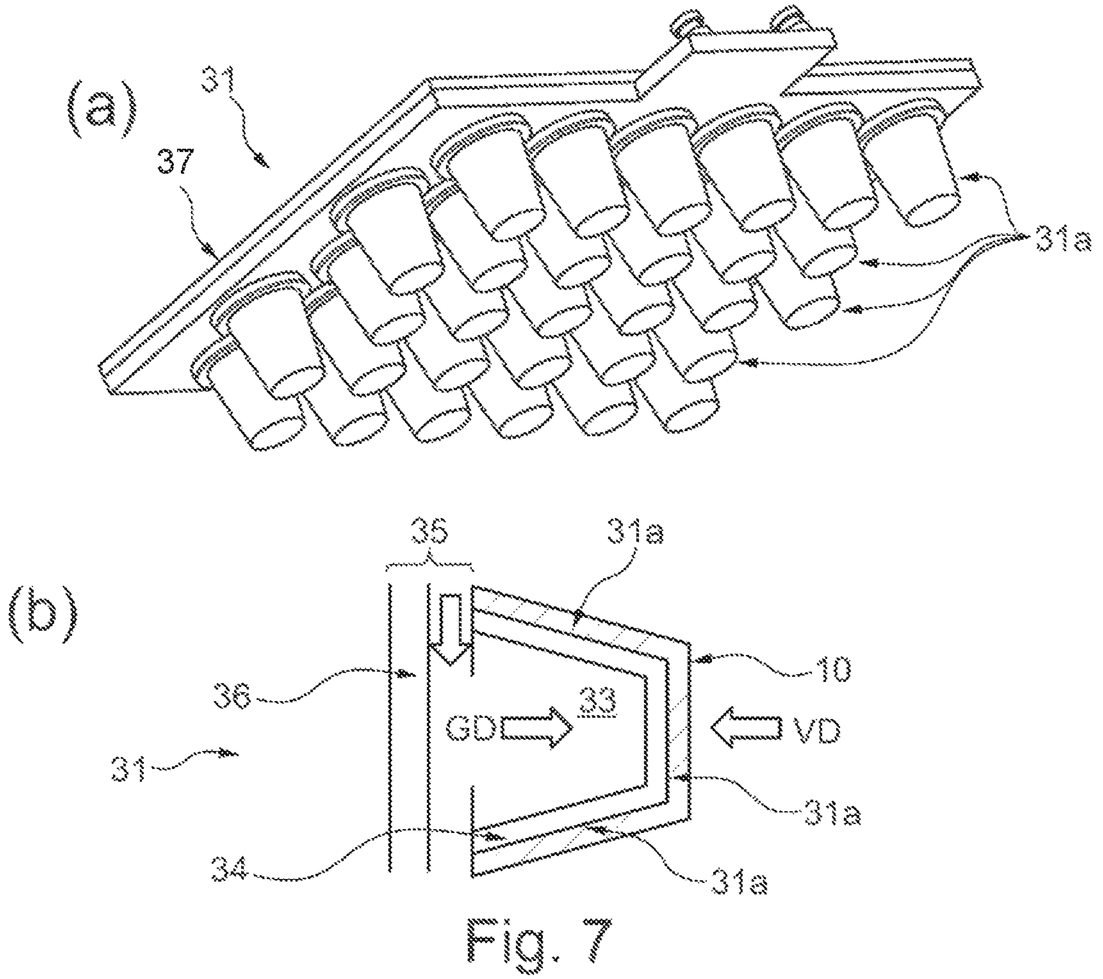
Figure 8:
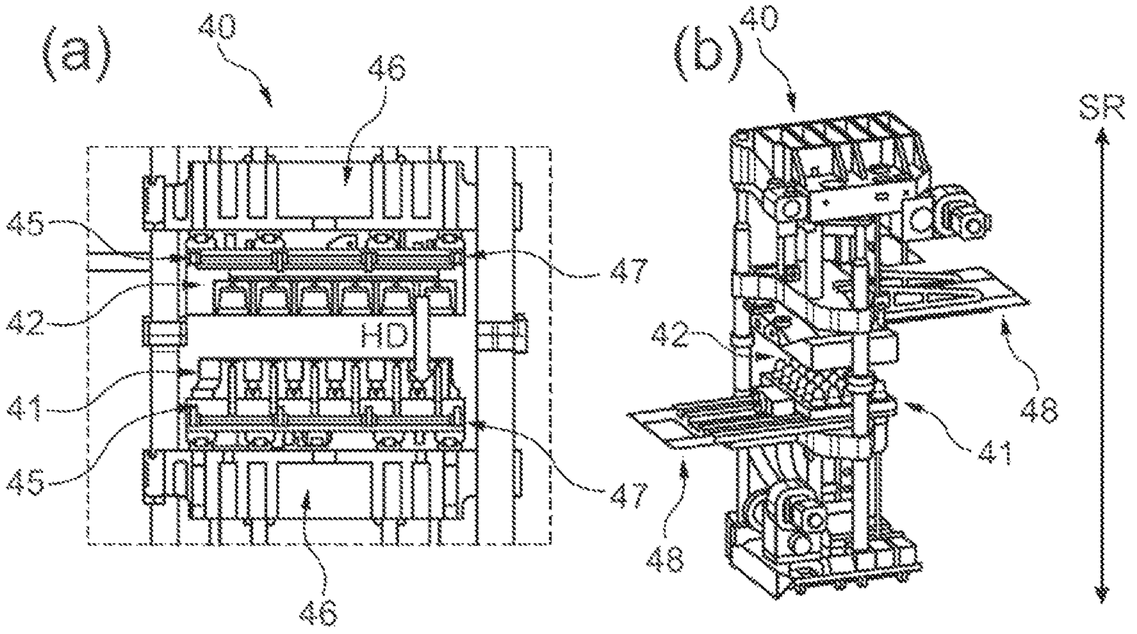
Figure 9:
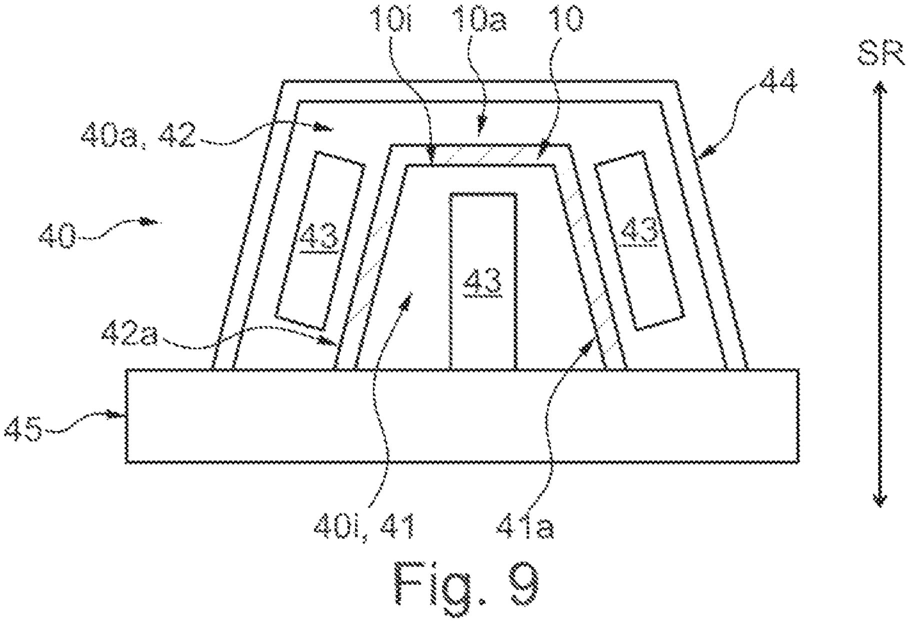
Figure 10:
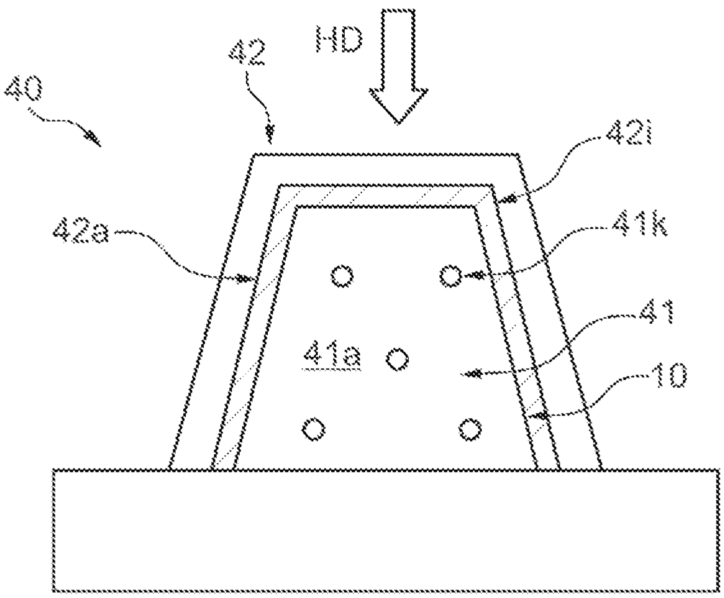
Figure 11:
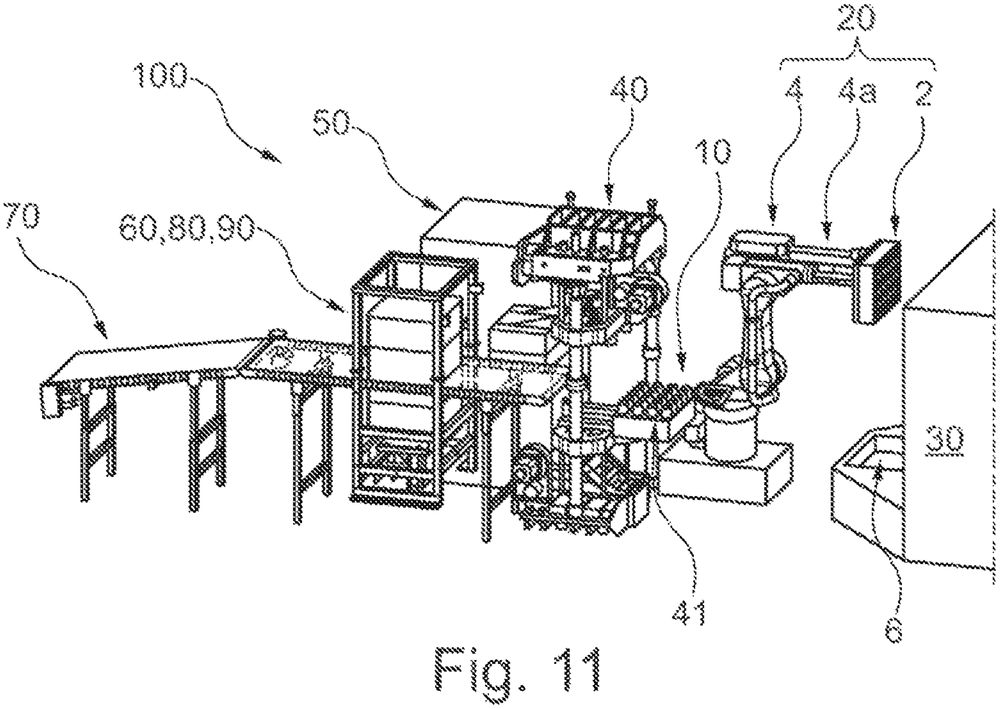
Figure 12:
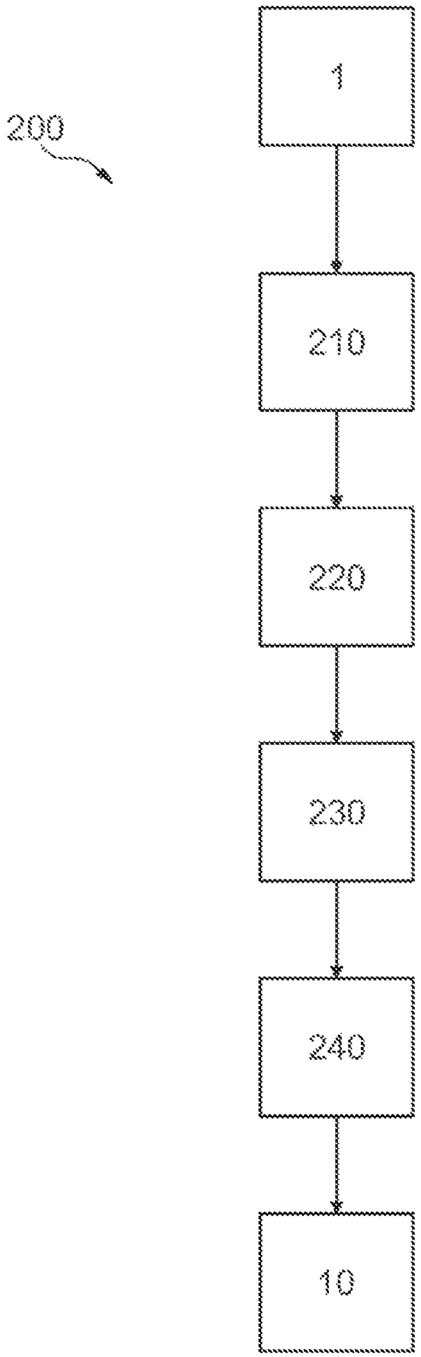
Figure 13:
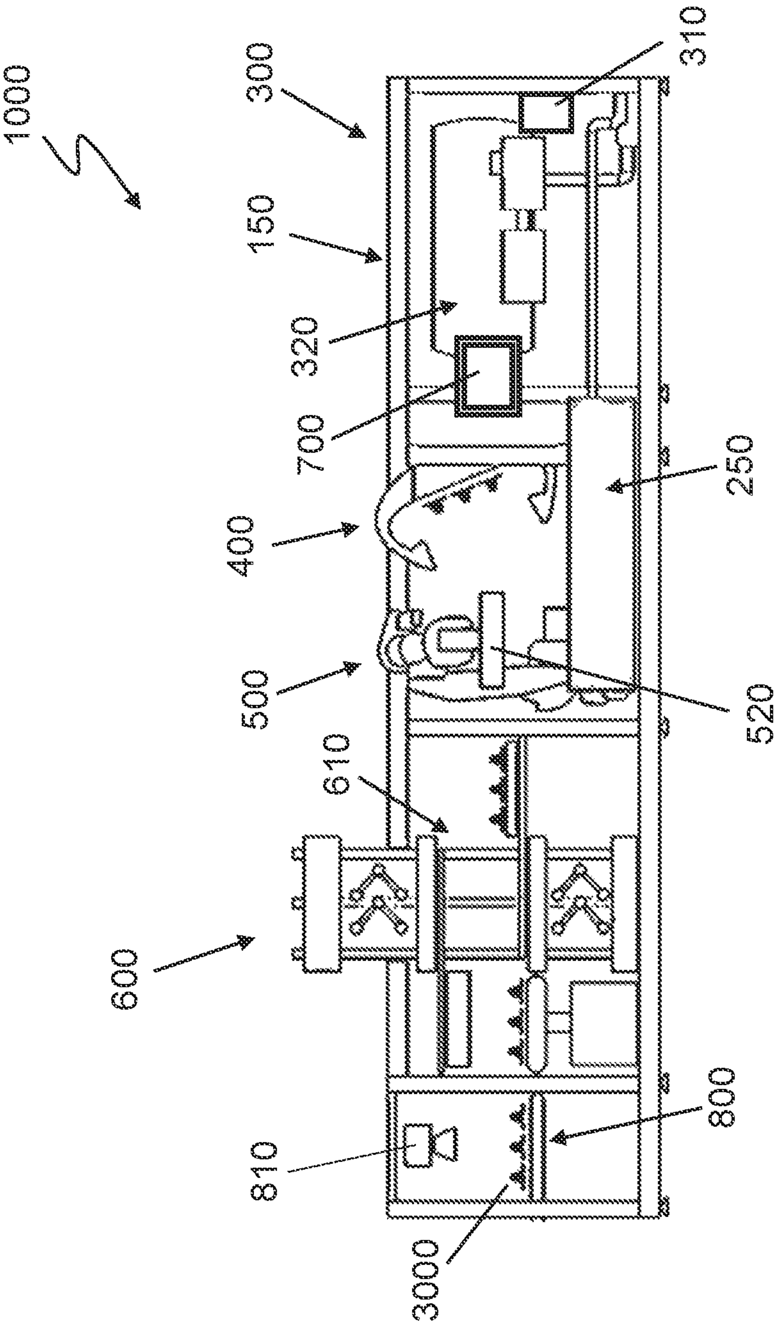
Figure 14:
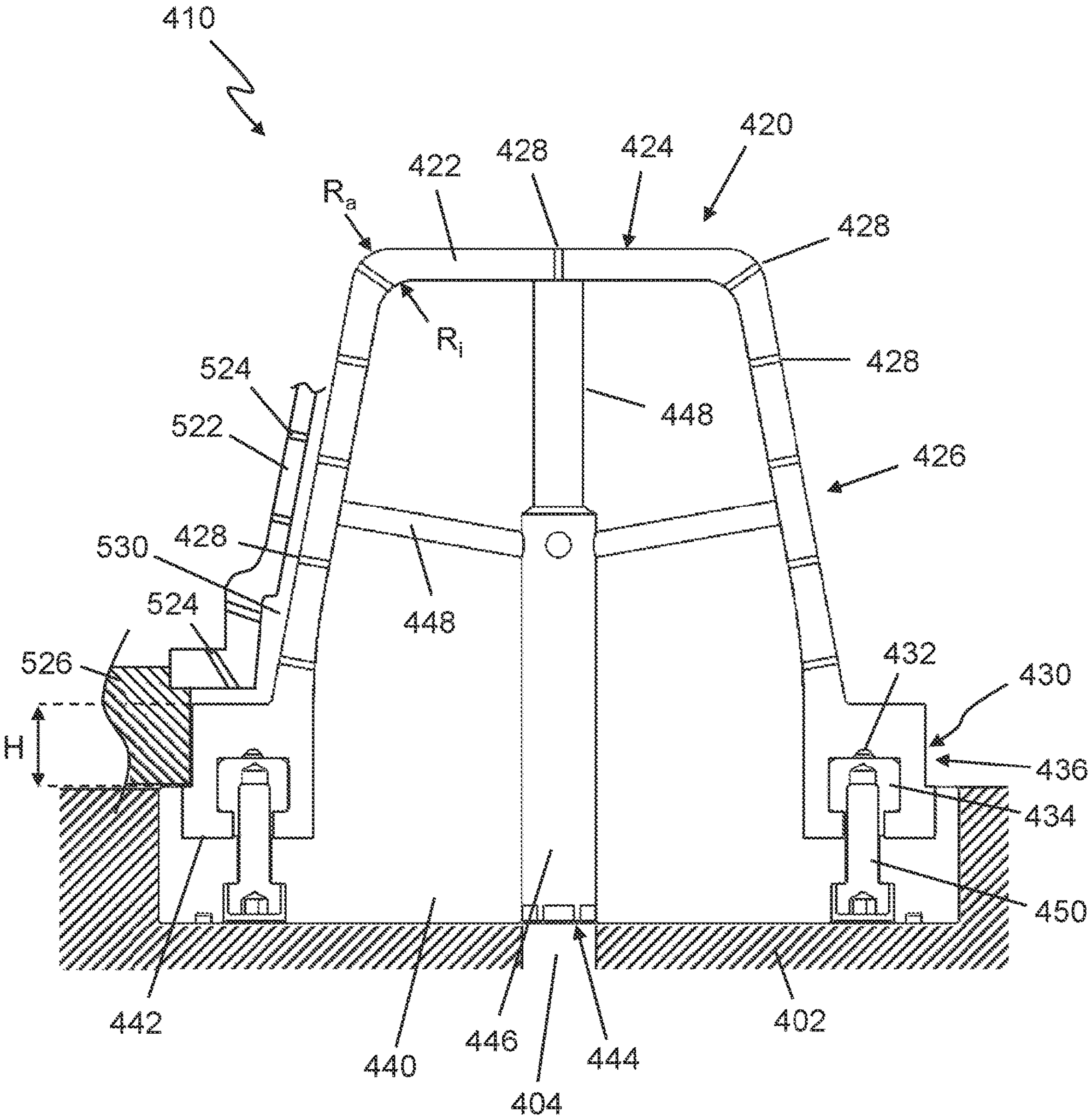
Figure 15:
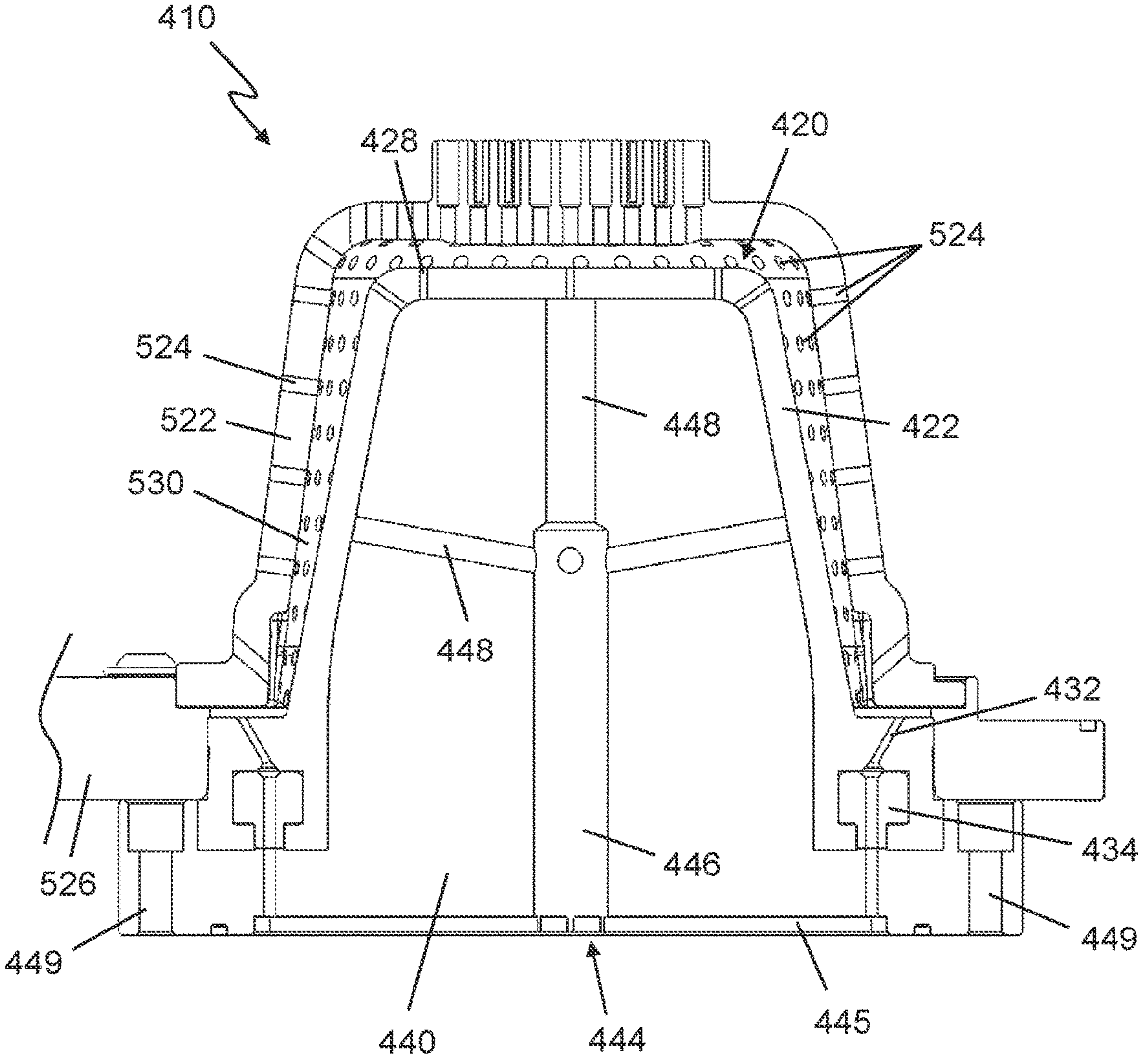

FIG. 1: shows an embodiment of the suction head with a negative and positive form (a) before molding and (b) after molding the formed part;

FIG. 2: shows an embodiment of the pulp reservoir with pulp;

FIG. 3: shows an embodiment of the suction head according to some embodiments as a lateral section;

FIG. 4: shows an embodiment of the suction tool according to some embodiments in lateral section;

FIG. 5: shows a further embodiment of the suction tool according to some embodiments with modules (a) in plan view of the suction side and (b) in lateral section along the cutting plane A-B;

FIG. 6: shows an embodiment of the molding and preforming stations according to some embodiments;

FIG. 7: shows an embodiment of the prepressing lower tool according to some embodiments as a multi-tool (a) in perspective view of the multi-tool and (b) in lateral section of a single prepressing lower tool in the multi-tool;

FIG. 8: shows a further embodiment of the hot-pressing station according to some embodiments (a) in side view and (b) in perspective view;

FIG. 9: shows a schematic representation of an embodiment of the hot-pressing lower tool and hot-pressing upper tool of the hot-pressing station from FIG. 8 during hot-pressing;

FIG. 10: shows a schematic representation of a further embodiment of the hot-pressing lower tool and hot-pressing upper tool of the hot-pressing station from FIG. 8 during hot-pressing;

FIG. 11: shows an embodiment of the fiber-forming system according to some embodiments;

FIG. 12: shows a schematic representation of an embodiment of the method according to some embodiments;

FIG. 13 shows a schematic representation of a fiber processing device;

FIG. 14 shows a schematic sectional view of a mold body with a support structure; and FIG. 15 shows a further schematic sectional view of a mold body with a support structure.

DETAILED DESCRIPTION

FIG. 1 shows an embodiment of the suction head 21 with negative and positive form (a) before molding and (b) after molding the formed part in a molding station 20 of a fiber-forming system 100 (shown in FIG. 11) for molding 210 (shown in FIG. 12) a formed part 10 from environmentally-friendly-degradable fiber material 11 (shown in FIG. 2). The molding station 20 is described globally in FIG. 6, while only the suction tool 2 for sucking in, from a reservoir 6 with a pulp 1 as a liquid solution with the environmentally-friendly-degradable fiber material 11, the environmentally-friendly-degradable fiber material 11 for molding 210 the formed part 10 is discussed, wherein the suction tool 2 comprises a suction head 21 with a three-dimensionally shaped suction head suction side 21*s*, the shape of which is adapted to a contour 10*i*, 10*a* of the later formed part 10, and the formed part 10 is molded on the suction head suction side 21*s* by means of a vacuum in the suction tool 2. The suction head suction side 21*s* of the suction head 21 is formed from a porous screen 22, on whose pulp side 22*p* facing the pulp 1 the environmentally-friendly-degradable fiber 11 adheres due to the suction for molding 210 the formed part 10 (see formed part 10 in FIG. 2*c*). For this purpose, the suction tool 2 comprises a plurality of suction channels 23, which terminate on the suction-side surface 23*s* below the screen 22 and is distributed over the suction-side surface 23*s* in such a way that essentially the same suction power is made possible in all areas between the screen 22 and the suction-side surface 23*s*. For this purpose, the suction channels 23 can have openings in the suction-side surface 23*s* with diameters of less than 4 mm. The cross-sectional area of the suction channels 23 can have any suitable shape, for example, the cross-sectional area can be circular or oval. For this purpose, the suction channels 23 also have an uneven distribution on the suction-side surface 23*s*, wherein in the area of negative edges in the formed part 10 by 40%-60% fewer and/or in the area of positive edges 10%-30% more suction channels 23 per unit area are arranged than with plane surfaces. The suction head for molding the formed part only needs to be slightly immersed in the pulp 1, so that a closed cavity is formed in the interior 21*i* of the suction head. In other embodiments, the suction head 21 could also be completely immersed in the pulp 1. The liquid solution of the pulp 1 passing through the screen 22 during the molding 210 is discharged from the suction tool 2. For this purpose, the suction head 21 comprises on its end face 21*p* facing the pulp 1 a collecting ring 24 (shown in FIG. 1(*a*), left side) for receiving the liquid solution of the pulp 1 sucked through the suction head suction side 21*s*, which collecting ring is connected to a discharge channel 25 for the liquid solution. The suction head suction side 21*s* of the suction head 21 can be designed either as a negative form (left part of FIG. 1) as the suction head inside 21*i* or as a positive form (right part of FIG. 1) as the suction head outside 21*a*. In the case of a negative form, the formed part 10 (gray inner layer in the suction head 21, FIG. 1*b* left) which is formed toward the inside 21*i* of the suction head by means of the suction pressure SD is placed on the prepressing lower tool 31 (shown in FIGS. 6-7) with a pressing surface 31*a* (shown in FIG. 7) as the outer surface of the prepressing lower tool 31 for prepressing. With a positive form, the suction head 21 is completely immersed in the pulp 1 for contacting to suck up the pulp 1 with the fiber material 11. Thereafter, the formed part 10 (gray outer layer on the suction head 21, FIG. 1*b* right) which is formed on the outside of the suction head 21*a* due to the suction pressure SD is inserted for prepressing into the prepressing lower tool 31, which has a shape adapted to the positive form of the suction head 21 with a pressing surface 31*a* as an inner surface of the prepressing lower tool 31. The suction head 21 further comprises a gas line system 27, which supplies the vacuum provided to the suction head 21 as suction pressure SD.

FIG. 2 shows an embodiment of the pulp reservoir 6 with pulp, where the environmentally-friendly-degradable fiber material 11 is indicated as "waves". The pulp 1 can contain less than 5%, preferably less than 2%, particularly preferably between 0.5% and 1.0% of environmentally-friendly, degradable fiber material 11 in a liquid solution, for example, an aqueous solution. Advantageously, the pulp 1 does not include any organic binder, preferably no binder at all. The environmentally-friendly-degradable fiber material 11 can essentially consist of fibers with a fiber length of less than 5 mm. The pulp 1 is provided at a temperature of less than or equal to 80° C., preferably less than or equal to 50° C., particularly preferably at room temperature.

FIG. 3 shows an embodiment of the suction head 21 according to some embodiments as a lateral section, the screen 22 having a wavy structure with wave crests 22*w* and wave troughs 22*t* along the suction-side surface 23*s*. The screen 22 rests with the wave crests 22*w* of its side 22*s* facing the suction-side surface 23*s* during suction and is thus mechanically supported in its shape by the suction-side surface 23 so that the screen 22 does not change geometrically during the molding process and therefore ensures a shape accuracy for the formed part that is subsequently formed. The screen 22 is fastened in the suction head 21 (indicated on the lower side) with a reversible fastening means 28, designed here as clamping means, to the suction head 21. Additionally or alternatively, the screen 22 could also be fastened in at least some of the suction channels 23. Furthermore, the fiber material 11 is an example of the molded fiber material 11, indicating how the fiber material 11 molds on the screen 22, so that the formed part is molded as a whole as a result of the suction of the pulp.

FIG. 4 shows an embodiment of the suction tool 2 according to some embodiments in a lateral section. In this case, the suction tool 2 is a multi-tool with a plurality of suction heads 21. These suction heads are arranged on the suction side in a two-dimensional arrangement with four rows of 5 suction heads each. In other embodiments, multi-tools 2 can also have different numbers of rows and columns of suction heads 21. The suction tool 2 here comprises a base plate 26 with suction heads 21 mounted thereon and a gas line system 27 in the base plate 26. The base plate 26 is not to be understood here as a thin plate, but refers to the rear structure of the suction tool 2, which serves to connect the movement unit 4 and the suction heads 21. The gas line system 27 distributes the vacuum provided by a vacuum pump 5 as suction pressure SD to the suction heads 21 for sucking in the fiber material 11. The gas line system 27 here also comprises a compressed gas line 27*d* for applying compressed air to the suction heads 21 in order, for example, to release or eject the molded or preformed formed parts 10 (shown in FIG. 1) from the suction heads 21. The gas line system 27 for the vacuum (suction pressure) for molding the formed parts 10 comprises one or more main gas lines 27*h* and secondary gas lines 27*n*, wherein the main gas lines 27*h* are provided for generating a pre-vacuum and the secondary gas lines 27*n* are provided as a supplement to the main gas lines 27*h* for achieving the suction pressure SD after contacting the suction tool 21 with the pulp 1. The main gas lines preferably have a large cross section, while the secondary gas lines have a smaller cross section. One or more valves 27*v* (here two valves 27*v* in the main gas line 27*h*) are arranged in the gas line system 27 to switch off the suction pressure SD at the suction heads 21 as soon as the suction tool has left the pulp 1 and/or to at least switch the secondary gas lines to the main lines as soon as the suction tool 2 is immersed in the pulp 1. The multi-tool 2 is connected to the robotic arm 4*a* via the interface 4*s*, comprising all media supply connections for the suction tool 2 with the movement unit 4. Movement unit 4 and suction tool 2 are configured to eject the formed parts 10 from the suction heads 21 of the suction tool 2 by means of compressed air provided by the compressed gas line 27*d* and distributed to the individual suction heads 21 via the base plate 26.

FIG. 5 shows a further embodiment of the suction tool 2 according to some embodiments with modules 29 (*a*) in a plan view of the suction side and (b) in a lateral section along the cutting plane A-B. The individual shapes of the suction heads 21 in the suction tool 2 as a multi-tool can differ at least in part, with the same shapes of the suction heads 21 being arranged adjacently in the suction tool 2 in respective separate modules 29. For example, in a first module 29 there are four suction heads for the production of larger cups, in a second module 29 six suction heads for the production of smaller cups, in a third module 29 two suction heads for the production of smaller bowls and in a fourth module 29 one suction head for the production of a larger bowl.

FIG. 6 shows an embodiment of the molding and preforming stations 20, 30 according to some embodiments, with the molding station 20 being part of the preforming station 30 here. The molding station 20 comprises the suction tool 2 (designed here as a multi-tool) for sucking in the environmentally-friendly-degradable fiber material 11 (shown in FIG. 2) for molding 210 (shown in FIG. 12) the formed part 10 (shown in FIG. 7) out of a reservoir 6 with a pulp 1 as a liquid solution with the environmentally-friendly-degradable fiber material 11 (further details on the suction head see FIGS. 1-5) and a movement unit 4, on which the suction tool 2 is mounted, and which is provided at least for placing or for partially immersing the suction tool 2 on or in the pulp 1. The preforming station 30 comprises the reservoir 6 with the pulp 1 as a liquid solution with the environmentally-friendly-degradable fiber material 11 for molding the formed part 10 in the suction tool 2, arranged as a horizontal reservoir 6 that is open at the top, and a prepressing station 3 (designed here as a multi-tool) for preforming 220 of the formed part 10 already molded by means of the molding station 20 with a prepressing pressure VD for reducing a proportion of the liquid solution in the formed part 10 and for stabilizing the shape of the formed part 10. Furthermore, the preforming station 30 comprises a pulp preparation and replenishment unit 35 for replenishing the pulp 1 for the reservoir 6. For example, in the preparation and replenishment unit 35, the pulp is premixed from a solvent and a fiber material 11, finally mixed to form the production pulp 1, fed into the reservoir and/or reused from returns from the suction tool 2 and/or the prepress station 3, wherein, in this case, the proportion of the fiber material 11 has to be reset to the desired proportion so that the production pump does not thin out the fiber material 11 during the ongoing process. For this purpose, the pulp preparation and replenishment unit 35 comprises one or more containers (two shown here) for solvent and mixed pulp as well as a depot for the fiber material 11. The pulp preparation and replenishment unit 35 fills the reservoir 6 at least periodically, preferably continuously, as a function of the consumption of pulp by the molding of the formed part 10, in order to achieve a required fill level of the reservoir 6 and the desired proportion of fiber material 11 in the pulp 1 for molding. The prepressing station 3 can be arranged relative to the reservoir 6 and configured in such a way that the liquid solution removed from the formed part by the prepressing is fed back into the reservoir 6. For this purpose, the prepressing station 3 can be arranged in a vertical alignment above the reservoir 6 so that the liquid solution removed from the formed part by the prepressing flows back into the reservoir 6 from the prepressing station 3 directly into reservoir 6. In addition, the molding station 20 can be connected to the preforming station 30 via suitable lines (not shown here) in such a way that the liquid solution and/or fiber material 11 that has passed through the suction head 21 via the preforming station 30 is fed back into the pulp 1 by means of the pulp preparation and replenishment unit 35. The movement unit 4 here comprises a robotic arm 4*a* that can move freely in space and on which the suction tool 2 is mounted. The robotic arm 4*a* is connected to the suction tool 2 with a suitable interface 4*s* comprising all media supply connections for the suction tool 2. Depending on the application and the process, the movement unit 4 can be provided to completely immerse the suction heads 21 into the pulp 1 for contacting. The movement unit 4 is provided for transferring the formed parts 10 in the suction tool 2 to the prepressing station 3 of the preforming station 30 and to the hot-pressing station 40 and to eject them for the hot-pressing process at the latter. The movement unit 4 and the suction tool 2 are configured to leave the formed parts 10 in the suction tool 2 in the prepressing station 3. The prepressing is thus performed with a prepressing lower tool 31 and the suction tool 2 as the prepressing upper tool. In this case, the prepressing pressure can be exerted on the formed parts between the prepressing lower tool 31 and the suction tool 2, for example, by means of a hydraulically operated piston rod or by means of the robotic arm. The prepressing can be performed at a temperature of the prepressing station 3 of less than 80° C., preferably less than 50° C., particularly preferably at room temperature, wherein the prepressing pressure VD is between 0.2 $N/mm^2$ and 0.3 $N/mm^2$, preferably between 0.23 $N/mm^2$ and 0.27 $N/mm^2$. In an alternative embodiment, the prepressing (preforming) can also be performed with a membrane 32 as a prepressing lower tool 31 as a membrane press (not shown here). The suction tool 2 would then be inserted into the correspondingly shaped prepressing lower tool 31 with a positive form as the suction head suction side 21*s*. For membrane pressing, the membrane 32 would be configured as a flexible membrane. The prepressing pressure VD would be applied as gas pressure to the membrane 32 which is then pressed onto the outer contour of the formed part 10. As a result, pressure can also be exerted on surfaces of the formed part 10 that cannot be applied in this way by means of hydraulic pressing, since the gas pressure applies the membrane to all surfaces with the same pressure, independent of direction. The movement unit 4 and the suction tool 2 are also designed to eject the formed parts 10 in the hot-pressing station from the suction tool 2 for the subsequent hot-pressing. This can be done, for example, by means of compressed air, which ejects the formed parts 10 from the suction heads 21 of the suction tool 2.

FIG. 7 shows an embodiment of the prepressing lower tool according to some embodiments as a multi-tool with a plurality of prepressing lower tools 31 adapted to the suction tool 2 (shown in FIG. 6) (a) in a perspective view of the multi-tool and (b) in a lateral section of an individual prepressing lower tool in the multi-tool. The prepressing lower tool 31 is adapted here to a negative form of the suction heads 21 so that the formed part 10 can be placed onto the prepressing lower tool 31 in such a way that it is arranged between the prepressing lower tool 31 and the suction tool 2 so that the suction tool 2 can be pressed onto the prepressing lower tool 31 with the prepressing pressure VD. In this case, the prepressing lower tool 31 has a pressing surface 31*a* facing the formed part 10, which has a lower surface roughness than the screen 22 (shown in FIG. 3) of the suction tool 2. The prepressing lower tool 31 can be made of metal, for example, or at least partially of an elastomer, preferably silicone. In the embodiments shown here, the prepressing lower tool 31 is made in part from an elastomer, in this case silicone. The prepressing lower tool 31 has a cavity 33 which is surrounded by a wall 34 made of the elastomer as a pressing surface 31*a*, wherein the prepressing station 3 is configured to apply gas pressure GD to the cavity 33 during prepressing in order to generate the prepressing pressure VD on the formed part 10 and suction tool 2 or at least to support the prepressing pressure exerted by the suction tool 2 with the gas pressure GD directed in the opposite direction (see FIG. 7*b*). In the multi-tool, the individual prepressing lower tools 31 are arranged on a common carrier plate 37, which is equipped as an interface to the prepressing station 3 for reversible attachment to the prepressing station and/or for supplying the individual pressing lower tools 31 with gas pressure. Here, the carrier plate 37 also has a heating element 36 (shown in FIG. 7(*b*)) which extends over the surface of the carrier plate 37 in order to enable the prepressing lower tools 31 to be heated.

FIG. 8 shows a further embodiment of the hot-pressing station 40 according to some embodiments (a) in side view and (b) in perspective view comprising a hot-pressing lower tool 41 adapted to a contour 10*i* of the formed part 10 for receiving the formed part 10 and a hot-pressing upper tool 42, correspondingly adapted to the formed part 10, for placing onto or inserting into the formed part 10 along a closing direction SR of the hot-pressing station 40, wherein the hot-pressing lower tool 41 and the hot-pressing upper tool 42 apply a hot-pressing pressure HD to formed part 10 arranged between the hot-pressing lower tool 41 and the hot-pressing upper tool 42 during hot-pressing. In the case of a negative form of a suction tool 2, the hot-pressing lower tool 41 also has a negative form (as shown here) and is thus provided as an inner tool 40*i* in the hot-pressing station 40, while the hot-pressing upper tool 42 is placed on it as an outer tool 40*a* for hot-pressing. In the case of a positive form of the suction tool 2 (not shown here), the hot-pressing lower tool 41 would also have a positive form and would be provided as an outer tool 40*a*, while the hot-pressing upper tool 42 would be inserted in the hot-pressing lower tool 41 as an inner tool 40*i* for hot-pressing. The hot-pressing lower tool 41 and the hot-pressing upper tool 42 are designed here as complementary multi-tools with a plurality of hot-pressing lower tools 41 and hot-pressing upper tools 42 arranged on respective carrier plates 45 for the respective hot-pressing lower tools 41 and hot-pressing upper tools 42. The carrier plates 45 are laterally movably mounted in the hot-pressing station 40 (see FIG. 8*b*) to enable the respective hot-pressing lower tools 41 and hot-pressing upper tools 42 to be changed as multi-tools outside of a process space of the hot-pressing station 40. The carrier plate 45 of the hot-pressing upper tools 42 of the multi-tool is provided with gas lines in order to, depending on the process step, apply a vacuum in the respective hot-pressing upper tools 42 to hold the formed parts 10 in and/or an overpressure to eject the final-shaped formed parts 10 from the hot-pressing upper tools 42. The hot-pressing upper tool 42 can then be used to eject the final-shaped formed parts 10 for further transport, for example, onto a conveyor belt 95 connected to the hot-pressing station. For this purpose, the carrier plate 45 can be moved from the hot-pressing position into an ejection position. Furthermore, expansion means 47 for compensating for thermal expansion effects are arranged between the carrier plate 45 and a holder 46 for the carrier plate 45. Thermally insulating material 44 can be arranged between the carrier plate 45 and the holder 46, see, for example, FIG. 9.

FIG. 9 shows a schematic representation of an embodiment of the hot-pressing lower tool 41 and hot-pressing upper tool 42 of the hot-pressing station 40 from FIG. 8 during hot-pressing. The respective hot-pressing sides 41*a*, 42*a* of the hot-pressing lower tool 41 and the hot-pressing upper tool 42 facing the formed part 10 are heated by means of electric heating cartridges 43. The heating cartridges 43 in the hot-pressing lower tool 41 and hot-pressing upper tool 42 are configured and arranged in such a way that the hot-pressing sides 41*a*, 42*a* can be heated to temperatures greater than 150° C., preferably between 180° C. and 250° C. The heating cartridges 43 can be controlled in such a way that the temperatures of the hot-pressing lower tool 41 and the hot-pressing upper tool 42 differ, wherein the hot-pressing upper tool 42 can have a higher temperature than the hot-pressing lower tool 41; the temperatures preferably differ by at least 25° C., preferably not more than 60° C., more preferably around 50° C. For this purpose, the heating cartridges 43 are arranged close to the contour of the formed part 10 in the respective hot-pressing upper tools 42 and hot-pressing lower tools 41, and the respective hot-pressing upper tools 42 and hot-pressing lower tools 41 are made of metal. Here, a heating cartridge 43 is arranged centrally in the inner tool 40*i* parallel to the closing direction SR with a first heating output, while in the outer tool six heating cartridges 43 with second heating outputs are arranged concentrically around the closing direction SR parallel to the hot-pressing side 41*a*, 42*a* of the inner tool 40*i*, wherein the first heating output is greater than the second heating output. Furthermore, here the hot-pressing upper tools 42 comprise a covering 44 made of a thermally insulating material on the sides facing away from the formed part 10.

FIG. 10 shows a schematic representation of a further embodiment of the hot-pressing lower tool 41 and hot-pressing upper tool 42 of the hot-pressing station 40 from FIG. 8 during hot-pressing. After prepressing has taken place, the prepressed formed part 10 is transferred to the hot-pressing station 40 by means of the suction tool 2, wherein the formed part 10 is removed from the suction tool 2 for subsequent hot-pressing. The hot-pressing station 40 comprises a hot-pressing lower tool 41 with a hot-pressing side 41*a* adapted to a contour of the formed part 10 and a hot-pressing upper tool 42, wherein the formed part 10 is placed from the suction tool 2 onto the hot-pressing lower tool 41 (here with a negative form. With a positive form, it would be inserted into the hot-pressing lower tool). During hot-pressing, the hot-pressing upper tool 42 is then pressed onto the hot-pressing lower tool 41 with the formed part 10 arranged in between. The hot-pressing lower tool 41 may be made of metal. The hot-pressing lower tool 41 also comprises channels 41*k* to its hot-pressing side 41*a*, with which the liquid solution can be at least partially removed from the formed part 10 during hot-pressing. These channels 41*k* can have a diameter of less than or equal to 1.0 mm, at least on the hot-pressing side. In this case, the channels can have any suitable geometry as a cross-sectional area. For example, the channels 41*k* have a round or elliptical cross section. The hot-pressing upper tool 42 is adapted to the contour of the formed part 10 at least with the side 42*i* facing the formed part; the hot-pressing upper tool 42 is preferably also made of metal. Different temperatures can be used for the hot-pressing lower tool 41 and the hot-pressing upper tool 42 during hot-pressing; preferably, the hot-pressing upper tool 42 has a higher temperature than the hot-pressing lower tool 41, the temperatures differing by at least 25° C., preferably not more than 60° C., particularly preferably by 50° C. The hot-pressing can be performed at a temperature greater than 150° C., preferably between 180° C. and 250° C. The hot-pressing 140 is performed at the hot-pressing pressure HD that is higher than the prepressing pressure VD. The hot-pressing pressure HD can be between 0.5 $N/mm^2$ and 1.5 $N/mm^2$, preferably between 0.8 $N/mm^2$ and 1.2 $N/mm^2$, wherein said pressure preferably is applied for a pressing time of less than 20 s, preferably for more than 8 s, more preferably between 10 and 14 s, even more preferably 12 s.

FIG. 11 shows an embodiment of the fiber-forming system 100 according to some embodiments for producing formed parts 10 from environmentally-friendly-degradable fiber material 11, comprising a reservoir 6 for providing a pulp 1 as a liquid solution with environmentally-friendly-degradable fiber material 11 as part of the preforming station 30. In a molding station 20, a movement unit 4 immerses a suction tool 2 attached to it, which has a suction head 21 with a three-dimensionally shaped suction head suction side 21*s*, the shape of which is adapted to a contour of the later formed part 10, into the pulp 1. The pulp is provided by a pulp processing and replenishment unit 35 and is continuously renewed and replenished during operation. The movement unit 4 is designed here as a robot with a robotic arm 4*a* that can move freely in space. A robot 4 can carry out precise and reproducible movements in a confined space and is therefore particularly suitable for guiding the suction tool 2 between the pulp reservoir 6 and the prepressing station 3 of the preforming station 30. The suction tool 2 is connected to the robotic arm 4*a* via an interface 4*s*. Such an interface 4*s* enables a quick change of the suction tool 2, if necessary. The suction tool 2 is configured to mold the formed part 10 by sucking the environmentally-friendly-degradable fiber material 11 onto the suction head suction side 21*s* by means of suction pressure SD (vacuum) in the suction tool 2. The prepressing station 3 is provided for prepressing the molded formed part 10 with a prepressing pressure VD to reduce a proportion of the liquid solution in the formed part 10 and to stabilize its shape. The hot-pressing station 40, shown here with the hot-pressing lower tool 41 extended to take over the preformed formed parts 10 from the suction tool 2, is provided with a hot-pressing pressure HD for hot-pressing 150 the prepressed formed part 10 and thus for the final shaping of the formed part 10 and for further reducing the proportion of the liquid solution provided in the formed part 10. The ejection unit 70 then ejects the final-shaped formed part 10. To control the process performed, the fiber-forming system 100 comprises a control unit 50 which is suitably connected to the other components 20, 30, 35, 40, 60, 70, 80, 90 of the fiber-forming system 100 in order to control these components, including a cutting unit 80 and/or a stacking unit 90 and/or a conveyor belt 95. In particular, the fiber-forming system 100 can additionally comprise a coating unit 60 for applying one or more functional coatings to the formed part 10.

FIG. 12 shows a schematic representation of an embodiment of the method 200 according to some embodiments for the production of formed parts 10 from environmentally-friendly-degradable fiber material 11 by means of a fiber-forming process in a fiber-forming system according to some embodiments comprising subsequent steps of molding 210 the formed part in a molding station 20 according to some embodiments from a reservoir 6 with a pulp 1 as a liquid solution with the environmentally-friendly-degradable fiber material 11; preforming 220 the formed part 10 in a preforming station 30 according to some embodiments; final shaping 230 the preformed part 10 in a hot-pressing station 40 according to some embodiments; and ejecting 240 the final-shaped formed part 10 from the fiber-forming system 100 according to some embodiments.

Mold Body for a Pre-Pressing Tool, and Pre-Pressing Tool

The production of fiber-containing products from a pulp generally takes place in several work steps. For example, fibers can be suctioned in a cavity of a suction tool, thus forming a preform. For this purpose, the pulp is provided in a pulp supply, and the suction tool is at least partially immersed in the pulp with at least one suction cavity whose geometry essentially corresponds to the product to be manufactured. During the immersion, suction takes place via openings in the suction cavity, which are connected to a corresponding suction device, wherein fibers from the pulp accumulate on the surface of the suction cavity. Alternatively, suction can be provided by means of scooping, wherein a scoop tool is immersed in the pulp and during startup fibers are deposited on molded parts of the scoop tool. After this, the suctioned fibers are pressed to form finished molded parts.

Thus, it is an object to provide a solution for forming products made of fiber containing materials which eliminates the problems of the prior art wherein products made of fiber containing materials have poor quality. It is another object to provide tooling for forming products made of fiber containing materials with high quality which does not have a negative effect on the forming process. It is a further object to provide a simple configuration of forming parts for manufacturing products made of fiber containing materials, wherein the costs relating to servicing, maintenance and operation are reduced.

The above-mentioned problem is solved by a mold body for a pre-pressing tool for pressing three-dimensional preforms made of a fiber-containing material where the mold body includes a deformable material and is perforated at least in portions.

As a result of the perforated design, gas or gas mixture introduced for deformation, such as compressed or ambient air, which primarily presses a preform against a corresponding wall of a cavity via the elastic mold body, can additionally penetrate a moist preform and in the process support the drainage during pressing. Furthermore, excessively high pressure can thus be prevented, such that the elastic mold body can be deformed more uniformly. As a result, preforms can thus be better drained because the pressure is distributed evenly over the entire surface and the air flow through the preform additionally discharges water due to the saturation of the preform.

In further embodiments, the mold body can substantially image the geometry of the preform on an outer surface. In this way, preforms that have been introduced can be pressed when a pre-pressing tool is closed, even before compressed air or the like is introduced in order to deform the elastic mold body.

In further embodiments, the mold body can have a substantially identical or uniform wall thickness in wall and floor sections of three-dimensional preforms. It is thus possible to deform the elastic material substantially uniformly. In this way it is possible to prevent sections of preforms from being pressed to different degrees and with differences in terms of time.

In further embodiments, the mold body can have a larger radius at an inner surface in transitions from wall and floor sections than at a corresponding transition at an outer surface. A substantially uniform wall thickness of the elastic mold body in the molding or pre-pressing section can thus also be provided in such transitions. Furthermore, this assists uniform deformation when the mold body is subjected to pressure, since the pressure or the deformation of the flexible material takes place uniformly with the adjacent sections, which generally have a flat and uniform extension. In embodiments with smaller radii on an inner side than on the outer side, a stronger deformation relative to the adjacent sections can occur on the outer side.

In yet further embodiments, the mold body can have a reduced material thickness at an inner surface in transitions from wall and floor sections, as a result of which the expansion is deliberately greater when compressed air or the like is introduced, such as in adjacent sections.

In further embodiments, the mold body can be concave in wall and/or floor sections. This allows the expansion of the molded part to be staggered when the mold body is deformed, in order to achieve specific wall or floor designs, for example. For example, it may be required to press these sections to a lesser degree because less fiber material is contained, for example at an edge.

In further embodiments, the mold body can be silicone or include silicone. Silicone has proven to be advantageous as a material for pre-pressing since it can be used within a wide temperature range and, depending on the mixture and design, is sufficiently flexible but at the same time withstands sufficient pressure for pre-pressing.

In further embodiments, the mold body can have, with respect to a wall section and floor section, a greater material thickness in a connection section for a pre-pressing tool. The connection section is the location at which the mold body is connected to a pre-pressing tool. High loads occur in the connection section when the tool closes, and therefore sufficient rigidity—which also counteracts damage—is thereby provided.

In further embodiments, a connection section of the mold body for a pre-pressing tool can extend in an edge section for accommodating an edge of a preform. The connection section can in this case also provide, for example, at least partly, a molding and pre-pressing section.

In further embodiments, the mold body can have an integrated connection unit in a connection section for a pre-pressing tool. The mold body can be connected or connectable to a tool component of a pre-pressing tool, for example a tool plate, via the connection unit. An integrated design includes, for example, embodiments in which the connection unit is completely or almost completely surrounded by the flexible material of the mold body.

In further embodiments, the connection unit can be or include a metal or a metal alloy. A connection unit designed in this way can, for example, enter into a form-fitting connection or an integral bond to a tool plate or the like.

In further embodiments, the connection unit can have at least one connection element. A (direct) connection to a tool component (for example, tool plate) can take place via the at least one connection element.

In further embodiments, the at least one connection element can be or have a groove, a threaded hole, a pin, a screw or a latching opening. Thus, for example, a mold body with a connection unit designed as a ring can be connected via screws and corresponding threaded holes to a tool component of a pre-pressing tool.

In further embodiments, the connection section can have integrated edge ventilation for an edge of preforms. Thus, for the pre-pressing, an additional air supply can thus be provided over the entire surface, such that preforms can be treated uniformly over the entire surface during the pre-pressing.

The aforementioned problem is also solved by a pre-pressing tool having at least one mold body according to any of the aforementioned embodiments for pressing three-dimensional preforms made of a fiber-containing material, wherein the preforms have a moisture content of at least 50 wt. %, the tool having a first tool component having at least one support structure for a mold body made of a deformable material and a second tool component having a corresponding cavity, wherein, in the closed state of the pre-pressing tool, a mold cavity for pressing preforms is formed between an outer surface of the mold body and an inner wall of the corresponding cavity.

In further embodiments, the at least one support structure can have at least one channel via which a gas or gas mixture (e.g. (compressed) air) can be introduced between a surface of the at least one support structure and an inner surface of the mold body in order to deform the support structure and press a preform introduced into the mold cavity against the inner wall of the cavity via the outer surface of the at least one mold body.

In further embodiments, the at least one cavity can have openings for discharging water that escapes from preforms during a pre-pressing process.

In further embodiments, the at least one mold body can be detachably connected to a tool plate of the first tool component. In this way, it is possible to replace specifically only mold bodies that are damaged or contaminated and have to be replaced or cleaned. It is therefore not necessary to replace, for example, a tool plate having a plurality of molding and support structures of a tool component.

In further embodiments, the at least one mold body can have a portion that immerses in the at least one cavity in a connection section, which immersing portion is not used for pressing and, when immersing, causes fiber-containing material to push together in edge sections of preforms. The edge formation of preforms can thus be considerably improved so that subsequent processing, such as spraying by means of a spray bar to remove protruding fibers, or punching, can be dispensed with.

In further embodiments, the height of the immersing portion can be at least twice as great as the material thickness of the at least one mold body in a wall or base section.

In further embodiments, the at least one support structure for the at least one mold body can be replaceably connected to a tool plate of the first tool component. Thus, not only the mold body but also the associated support structure can be replaced. This makes it possible to retrofit a tool plate of a tool component onto other mold bodies and support structures in order to carry out pre-pressing of other preforms, for example. The pre-pressing unit having the pre-pressing tool therefore does not have to be replaced as a whole, which considerably reduces the costs of providing a pre-pressing tool.

In some embodiments, the aforementioned problem is solved by a mold body for a pre-pressing tool for pressing three-dimensional preforms made of a fiber-containing material where the mold body includes a deformable material and is perforated at least in portions, and where the mold body has, with respect to a wall section and floor section, a greater material thickness in a connection section for a pre-pressing tool.

The connection section is the location at which the mold body is connected to a pre-pressing tool. High loads occur in the connection section when the tool closes, and therefore sufficient rigidity—which also counteracts damage—is provided by means of the stronger design. In addition, preforms can thus be pre-pressed in an edge section, as described below in exemplary embodiments. For this purpose, a sufficiently stable pressing surface, or a press-mating surface relative to a further tool, is provided by the stronger wall thickness and overall stronger design, which can be reinforced by at least one insert made of metal (e.g., connection unit).

In some embodiments, the aforementioned problem is solved by a mold body for a pre-pressing tool for pressing three-dimensional preforms made of a fiber-containing material where the mold body includes a deformable material and has, with respect to a wall section and floor section, a greater material thickness in a connection section for a pre-pressing tool, and where the mold body has an integrated connection unit in the connection section for a pre-pressing tool.

The connection section is the location at which the mold body is connected to a pre-pressing tool and can be connected to a tool part via the connection unit. The mold body can be connected or connectable, for example to a tool component of a pre-pressing tool, for example a tool plate, via the connection unit. An integrated design includes, for example, embodiments in which the connection unit is completely or almost completely surrounded by the flexible material of the mold body.

The ability to replace a mold body via the connection unit makes it possible to perform a tool change and provide maintenance without an entire tool plate having a plurality of mold bodies as a whole having to be replaced or serviced.

In various embodiments, the aforementioned problem is also solved by a pre-pressing tool having at least one mold body according to any of the preceding embodiments for pressing three-dimensional preforms made of a fiber-containing material, wherein the preforms have a moisture content of at least 50 wt. %, the tool having a first tool component having at least one support structure for a mold body made of a deformable material with a connection unit integrated in the connection section, and a second tool component having a corresponding cavity, wherein, in the closed state of the pre-pressing tool, a mold cavity for pressing preforms is formed between an outer surface of the mold body and an inner wall of the corresponding cavity, and wherein the at least one mold body is detachably connected to the first tool component via the at least one connection unit.

In this way, it is possible to replace specifically only mold bodies that are damaged or contaminated and have to be replaced or cleaned. It is therefore not necessary to replace, for example, a tool plate of the first tool component having a plurality of molding and support structures of a tool component.

As described above, it is possible to form products made of fiber containing materials wherein devices for pre-pressing that have elastic mold bodies provide sufficiently deforming of pre-pressed preforms to different degrees over the geometry of the preforms, such that pre-pressed preforms do not have different thicknesses and moisture content due to poor tool configuration. In addition, the teachings disclosed herein prevent preforms remaining adhering to the pre-pressing tool or suction tool and/or tearing. Furthermore, damage of preforms in a subsequent hot pressing process due to preforms with sections that are moist to different degrees and dry at different rates are prevented by the teachings disclosed herein.

Further high costs and efforts in the service lives of a pre-pressing tool are prevented, since the flexible material, which is connected to a corresponding tool plate and which has to be replaced over time does not result in replacing a whole tool plate which has multiple flexible mold bodies arranged thereon, even if only one flexible mold body is damaged, since the elastic bodies are each removeable connected to a tool plate. The costs for maintenance can thus be reduced by the teachings disclosed herein.

In addition, due to the configuration of the mold body, fraying of edges of pre-pressed preforms does not occur, so that removing (e.g. cutting) frays in a complex manner in downstream steps is not necessary and can be omitted. Thus, the manufacturing is less expensive and less complex saving costs and process time.

FIG. 13 shows a schematic representation of a fiber processing device 1000 for producing three-dimensional molded parts from a fiber-containing material. In the exemplary embodiment shown, the fiber-containing material for the production of molded parts is processed in a pulp tank 250 of the fiber processing device 1000. For this purpose, water and fibrous materials as well as additives, if any, can be introduced into a pulp tank 250 via a liquid supply, and the pulp can be prepared in the pulp tank 250 by mixing the individual components with heat input and by auxiliary means, such as an agitator.

Pulp refers to an aqueous solution containing fibers, wherein the fiber content of the aqueous solution can be in a range of 0.1 to 10 wt. %. In addition, additives such as starch, chemical additives, wax, etc. can be contained. The fibers can be, for example, natural fibers, such as cellulose fibers, or fibers from a fiber-containing original material (for example waste paper). A fiber treatment plant offers the possibility of preparing pulp in a large quantity and providing several fiber processing devices 1000.

The fiber processing device 1000 can be used to produce, for example, biodegradable cups 3000, capsules, trays, plates, and other molded and/or packaged parts (e.g., as holder/supporting structures for electronic appliances). Since a fibrous pulp with natural fibers is used as the starting material for the products, the products manufactured in this way can themselves be used as a starting material for the manufacture of such products after their use, or they can be composted, because they can usually be completely decomposed and do not contain any substances that are harmful to the environment.

The fiber processing device 1000 shown in FIG. 13 has a frame 150 which can be surrounded by a cladding. The supply units 300 of the fiber processing device 1000 comprise, for example, interfaces for the supply of media (for example, water, pulp, compressed air, gas, etc.) and energy (power supply), a central control unit 310, at least one suction device 320, line systems for the various media, pumps, valves, lines, sensors, measuring devices, a bus system, etc., and interfaces for bidirectional communication via a wired and/or wireless data connection. Instead of a wired data connection, there can also be a data connection via a fiber optic line. The data connection can be, for example, between the control unit 310 and a central controller for multiple fiber processing devices 1000, to a fiber preparation plant, to a service point, and/or further devices. It is also possible to control the fiber processing device 1000 via a bidirectional data connection via a mobile device, such as a smartphone, tablet computer, or the like.

The control unit 310 is in bidirectional communication with an HMI panel 700 via a bus system or a data connection. The HMI (Human Machine Interface) panel 700 has a display which displays operating data and states of the fiber processing device 1000 for selectable components or the entire fiber processing device 1000. The display can be designed as a touch display so that adjustments can be made manually by an operator of the fiber processing device 1000. Additionally or alternatively, further input means, such as a keyboard, a joystick, a keypad, etc. for operator inputs, can be provided on the HMI panel 700. In this way, settings can be changed and the operation of the fiber processing device 1000 can be influenced.

The fiber processing device 1000 has a robot 500. The robot 500 is designed as a so-called 6-axis robot and is thus able to pick up parts within its radius of action, to rotate them and to move them in all spatial directions. Instead of the robot 500 shown in the figures, other handling devices can also be provided that are designed to pick up and twist or rotate products and move them in the various spatial directions. In addition, such a handling device may also be otherwise configured, in which case the arrangement of the corresponding stations of the fiber processing device 1000 may differ from the exemplary embodiment shown.

A suction tool 520 is arranged on the robot 500. In the exemplary embodiment shown, the suction tool 520 has cavities formed as negatives of the three-dimensional molded parts to be formed, e.g., cups 3000, as suction cavities 522. The suction cavities 522 can have, for example, a net-like surface on which fibers from the pulp are deposited during the suction. Behind the net-like surfaces, the cavities are connected to a suctioning device via channels in the suction tool 520. The suctioning device can be realized, for example, by a suction device 320 or a fan. Pulp can be suctioned in via the suctioning device when the suction tool 520 is located within the pulp tank 250 in such a way that the suction cavities 522 are at least partially located in the aqueous fiber solution, the pulp. A vacuum, or a negative pressure, for suctioning fibers, when the suction tool 520 is located in the pulp tank 250 and the pulp, can be provided via the suction device 320. For this purpose, the fiber processing device 1000 has corresponding means at the supply units 300. The suction tool 520 has lines for providing the vacuum/negative pressure from the suction device 320 in the supply units 300 to the suction tool 520 and the openings in the suction cavities 522. Valves are arranged in the lines, which can be controlled via the control unit 310 and thus regulate the suction of the fibers. It is also possible for the suction device 320 to perform a “blow-out” instead of a suction, for which purpose the suction device 320 is switched to another operating mode in accordance with its design.

During the production of molded parts made of a fiber material, the suction tool 520 is immersed in the pulp and a negative pressure/vacuum is applied to the openings of the suction cavities 522 so that fibers are suctioned out of the pulp and are deposited for example on the network of suction cavities 522 in the suction tool 520.

Thereafter, the robot 500 lifts the suction tool 520 out of the pulp tank 250 and moves said tool together with the fibers that are adhering to the suction cavities 522 and still have a relatively high moisture content of, e.g., over 80 wt. % water, to the pre-pressing station 400 of the fiber processing device 1000, the negative pressure being maintained in the suction cavities 522 for the transfer. The pre-pressing station 400 has a pre-pressing tool with prepress molds 410. The prepress molds 410 can be formed, for example, as positives of the molded parts to be manufactured and have a corresponding size with regard to the shape of the molded parts in order to receive the fibers adhering in the suction cavities 522.

During the production of molded parts, the suction tool 520 is moved, with the fibers adhering in the suction cavities 522, to the pre-pressing station 400 in such a way that the fibers are pressed into or against the suction cavities 522. The fibers are pressed together in the suction cavities 522, so that a stronger connection is thereby produced between the fibers. In addition, the moisture content of the preforms formed from the suctioned-in fibers is reduced, so that the preforms formed after the pre-pressing only have a moisture content of, for example, 60 wt. %. To squeeze out water, flexible prepress molds 410 can be used, which are inflated, for example, by means of compressed air (process air), and in the process press the fibers against the wall of a suction cavity 522 in a further suction tool part. As a result of the "inflation," both water is squeezed out, and the thickness of the sucked-in fiber layer is reduced.

During the pre-pressing, liquid or pulp can be extracted and returned via the suction tool 520 and/or via further openings in prepress molds 410 or pre-pressing tool parts (cavities).

After pre-pressing in the pre-pressing station 400, the preforms produced in this way are moved to a hot pressing station 600 on the suction tool 520 via the robot 500. For this purpose, the negative pressure is maintained at the suction tool 520 so that the preforms remain in the suction cavities 522. The preforms are transferred via the suction tool 520 to a lower tool body 620 which can be moved along the production line out of the hot pressing device 610. If the lower tool body 620 is in its extended position, the suction tool 520 is moved to the lower tool body 620 in such a way that the preforms can be placed on forming devices of the lower tool body 620. Subsequently, an overpressure is generated via the openings in the suction tool 520 so that the preforms are actively deposited by the suction cavities 522, or the suction is ended, so that the preforms remain on the forming devices of the lower tool body 620 due to gravity. By providing overpressure at the openings of the suction cavities 522, pre-pressed preforms resting/adhering in the suction cavities 522 can be released and dispensed.

Thereafter, the suction tool 520 is moved away via the robot 500 and the suction tool 520 is dipped into the pulp tank 250 in order to suction further fibers for the production of molded parts from fiber-containing material.

After the transfer of the preforms, the lower tool body 620 moves into the hot pressing station 600. In the hot pressing station 600, the preforms are pressed under heat and high pressure so as to produce finished molded parts, for which purpose an upper tool body 630 is brought onto the lower tool body 620 via a press. The upper tool body 630 has cavities corresponding to the forming devices. After the hot-pressing process, the lower tool body 620 and the upper tool body 630 are moved away from one another, and the upper tool body 630 is moved along the fiber processing device 1000 in the manufacturing direction; then, after the hot pressing, the molded parts are suctioned in via the upper tool body 630 and thus remain within the cavities. Thus, the manufactured molded parts are brought out of the hot pressing station 600 and deposited via the upper tool body 630 after traveling on a transport belt of a conveying device 800. After the molded parts are deposited, the suction via the upper tool body 630 is ended and the molded parts remain on the transport belt. The upper tool body 630 moves back into the hot-pressing station 600, and a further hot-pressing process can be carried out. Alternatively, the lower tool body 620 can be moved in an opposite direction prior to being extended to receive the preforms in order to move the manufactured products/molded parts out of the hot pressing device for further transport.

The fiber processing device 1000 further has a conveying device 800 with a transport belt. The manufactured molded parts made of fiber-containing material can be placed on the transport belt after the final molding and the hot pressing in the hot pressing station 600 and discharged from the fiber processing device 1000. In further embodiments, after placing the molded parts on the transport belt of the conveying device 800, further processing can take place, such as filling and/or stacking the products. The stacking can take place, for example, via an additional robot or another device.

The fiber processing device 1000 from FIG. 13 shows a possible embodiment. A fiber processing device according to the technical teaching described herein can also have only one forming station with a replaceable tool, e.g., a suction tool 520 or a hot press tool, in which fiber-containing material can be processed, it being possible for different tools for producing different three-dimensional molded parts to be received in the at least one forming station. The further stations and devices shown for the fiber processing device 1000 of FIG. 13 are not absolutely necessary for implementing the technical teaching.

FIG. 14 shows a schematic sectional view of a prepress mold 410 having a mold body 420 made of an elastic material 422 (e.g., silicone) and a support structure 440 of a pre-pressing tool of a pre-pressing station 400. FIG. 14 also schematically shows a tool body 402 of the pre-pressing tool of a pre-pressing station 400 and a tool body 526 of the suction tool 520.

The elastic material 422 is perforated and has a plurality of small openings, as indicated schematically in FIG. 14 by the openings 428. The diameter of the perforation or of the openings 428 is preferably in the range of 0.4 to 1.5 mm.

The mold body 420 is arranged on the support structure 440. The inner surface of the elastic, elastic material 422 rests on the support structure 440 in the inactive state in which it is not subjected to pressure. The support structure 440 is a metal or a metal alloy. Preferably, the material of the support structure 440 has aluminum or consists essentially of aluminum. In further embodiments, other suitable materials can also be used for the support structure 440. In the exemplary embodiment shown, the support structure 440 is solid. In further embodiments, the interior of support structures 440 can be designed to be substantially hollow or have free spaces. This can save weight for a pre-pressing tool, for example.

The support structure 440 is connected to the tool body 402 of the pre-pressing tool via fastening means (e.g., screws), not shown. Support structures 440 can thus be replaced for a tool change or for cleaning purposes. In further embodiments, support structures 440 can also be fixedly connected to a tool body 402 or formed integrally with a tool body 402.

The support structure 440 has, at its lower floor section shown in FIG. 14, a connector 444. From the connector 444, a channel 446 extends in the solid support structure 440 as a main channel to at least one further channel 448, in the embodiment shown to a plurality of further channels 448 which have a smaller diameter in comparison with the channel 446 in the exemplary embodiment shown. The design and number in the sectional view are represented by way of example and can deviate from the representation in further embodiments.

The channels 448 end at an outer surface of the support structure 440, at which the flexible material 422 of the mold body 420 rests in the inactive state. A feed channel 404 having a connector corresponding to the connector 444 is provided in the tool body 402. Compressed air can be introduced into the channel 446 and the channels 448 via the feed channel 404. The compressed air introduced then flows out of the support structure 440 and causes a deformation or "inflation" of the flexible material 422 of the mold body 420. Depending on thickness and the material used for the flexible material 422, the number and design of the channels 446, 448, the pressure and volume flow of the compressed air introduced, as well as other factors such as the perforation of the flexible material 422, the deformability of the mold body 420 can be influenced and controlled. In further embodiments, the surface of the support structure 440 and/or the inner side of the mold body can have structures (channels, grooves, etc.) which support the distribution over the entire surface of the mold body 420 when compressed air flows in. For example, channels 448 can have a greater diameter at their end in the outer surface of the support structure 440. Furthermore, openings in the outer surface of the support structure 440 connected with the channels 448 can be funnel-shaped so as to support air distribution over an area between the flexible material 422 and the outer surface of the support structure 440.

In the exemplary embodiment shown, the flexible material 422 of the mold body 420 has substantially the same wall or material thickness in a floor section 424 and in a wall section 426, so that deformation is uniform when compressed air is introduced into the space between the flexible material 422 and the surface of the support structure 440. It is thereby achieved that fiber-containing material of a preform is pressed uniformly, so that the fiber-containing material of the preform has a substantially uniform moisture content after the pre-pressing. As a result of the perforation of the flexible material 422, air is additionally guided through the fiber-containing material of a preform for dehumidification. The formation of the perforation and the compressed air introduced are to be coordinated in such a way that the deformation of the flexible material 422 takes place to a sufficient extent in order to provide the required pressing pressure that is required to squeeze out water from the relatively moist preforms.

The flexible material 422 has, in transitions from the floor section 424 to the wall sections 426 on the inner side, a radius R which is greater than the radius $R_a$ of the flexible material 422 on the outer side. This supports uniform deformation of the flexible material 422 in the transitions from the floor section 424 to the edge sections 426. The uniform wall thickness of the flexible material 422 extends substantially over the mold body 420 surface (product section) that is in contact with the preform to be pressed during pre-pressing. The pre-pressing of an edge of preforms generally takes place in the pressing direction of the suction tool 520 to the pre-pressing tool, such an edge of a preform being supported in this case in the horizontal portion (shown in FIG. 14) of a connection section 430 of the mold body 420. The pressure on the edge of a preform is generated by pressure of the suction tool 520 against the pre-pressing tool. In FIG. 14, the pre-pressing takes place from above via the suction tool 520 with the tool body 526 downwards against the tool body 402 with the prepress mold 410. It is therefore not necessary to apply compressed air to the flexible material 422 in the edge section of preforms in order to achieve "inflation." For the ventilation of the edge of a preform, the contact section of the flexible material 422 in the connection section 430 has openings, as for a preform through the perforation in the floor section 424 and wall section 426. The air for the edge ventilation is fed in via a channel 432, which is also connected to the channel 446. The connection between the channel 432 and the channel 446, like the openings in the edge section, is shown in FIG. 15.

To fasten the mold body 420 to the support structure 440, the mold body 420 has a ring 434 in the connection section 430. The ring 434 preferably is a metal (e.g., aluminum) or an alloy and, in the exemplary embodiment shown, has a plurality of preferably evenly distributed threaded holes via which the ring 434 is connected to the support structure 440 by means of screws 450. In further embodiments, a direct connection to a tool body 402 can also be realized via such a ring 434. The mold body 420 is thus replaceable so that, during a tool change or for cleaning and maintenance purposes, it is no longer necessary for an entire pre-pressing tool to be replaced, as is usually the case in the prior art.

In the exemplary embodiment shown, the support structure 440 has a substantially annular receptacle 442 in which the connection section 430 of the mold body 420 is received. The receptacle is adapted to the design of a connection section 430 and, in further embodiments, can also be designed to be angular or oval, depending on the design of the connection section 430 and the corresponding product geometry of a preform to be pre-pressed.

The flexible material 422 almost completely surrounds the ring 434 in the connection section 430. The ring 434 is accessible only in the section of the threaded holes. A ring 434 can be cast during the production of mold bodies 420.

The connection section 430 has a relatively large wall thickness at its outer edge 436 at a height H which is at least twice as large as the wall thickness in the product section. This increases the service life of the mold body 420. In addition, it provides a sufficient contact surface relative to the tool body 526 so that fibers that project over or out of the cavity in the interior of suction cavities 522 are pushed into the suction cavity 522 when the pre-pressing tool is closed or during the relative movement of the pre-pressing tool toward the suction tool 520. In this portion, the flexible material 422 serves as a wiper strip or block and prevents the formation of frayed edges in preforms and finished pressed or hot-pressed products. An additional station in fiber processing devices 1000 can thus be dispensed with.

During pre-pressing, the suction tool 520 with the suction cavities 522 is moved to the pre-pressing tool. Fibers from the pulp are deposited on nets or other similarly designed surfaces in the suction cavities 522. FIG. 14 shows part of a suction cavity 522 with channels 524 for suctioning in fibers from a pulp and for suctioning the fibers in order to hold the suctioned filter cakes or preforms. Furthermore, water is suctioned out of the filter cake and the preforms via the channels 524. The squeezed-out water is thereby removed, in particular during pre-pressing. The net, which is not shown in detail in FIG. 14, is located on the surface of the suction cavities 522.

During the relative movement of the suction tool 520 and the pre-pressing tool, the outer edge 436 of the connection section 430 first comes into contact with the inner wall surface of the tool body 526 (see FIG. 14). Any fibers protruding from or beyond the suction cavity 522 are pushed by the flexible material 422, as in the case of a sealing lip, into the suction cavity 522 during the relative movement. After the tool body 526 has come into contact with the tool body 402, as shown in FIG. 14, the pre-pressing process can be started. In further embodiments, the pre-pressing process can be started even before this position has been reached, for which purpose compressed air is introduced into the mold body 420 for deformation, as described above. Uniform deformation of the flexible material 422 takes place in the process and thus a uniform pre-pressing. In addition, during the relative movement of the suction tool 520 and the pre-pressing tool, the edge of preforms is pressed. By holding the preforms in the suction tool 520, water is continuously suctioned in by suction, including in the edge section.

At the latest after reaching the position shown in FIG. 14, the mold body 420 is deformed or maximally deformed according to the desired pre-pressing effect and drainage. The preform is drained and the wall thickness of the preform is reduced. Preforms are located within the mold cavity 530 (shown in FIG. 14) between the outer surface of the mold body 420 and the inner surface of the suction cavity 522 or the net or net-like structure arranged therein. It can be seen from FIG. 14 that the mold cavity 530 is reduced in size when the mold body 420 is deformed, so that a pressure on the fiber-containing material introduced therein can be built up. Such a pressure then causes the material to be pressed, with water being squeezed out and discharged via the channels 524. As stated above, an edge section of a preform can be pressed when the suction tool 520 is moved relative to the pre-pressing tool.

FIG. 14 partly shows only a prepress mold 410 and a suction cavity 522. In further embodiments, a pre-pressing tool and a suction tool 520 can be designed as multi-cavity tools and thus have a plurality of suction cavities 522 and corresponding prepress molds 410.

FIG. 15 shows a further schematic sectional view of a mold body 420 having a support structure 440, in which the connection of the channels 432 to the channel 446 and the connector 444 is shown. For this purpose, the support structure 440 has, at the bottom thereof, a channel-like connection 445 between the connector 444 or the channel 446 and the channels 434. The connection 445 can be formed at the bottom of the support structure 440 by a plurality of further channels extending in a star shape from the channel 446 or by a disk-like recess. At the bottom, the connection 445 can be closed via the tool body 402, as shown schematically in FIG. 14. Furthermore, the support structure 440 can have, at the bottom thereof, a circumferential seal at the outer edge so that no air flowing into the connection 445 can escape.

The channels 432 can extend through the ring 434, as shown schematically in FIG. 15.

FIG. 15 schematically shows the design of threaded holes 449 in the support structure 440. Screws are inserted into the threaded holes 449 for connection to a tool body 402, as shown in FIG. 14.

The design of the prepress molds 410 makes it possible to considerably reduce the servicing and maintenance outlay and to provide preforms which have improved quality at faster pre-pressing times; the design of edges of the preforms can additionally be improved, so that additional processing stations and steps can be dispensed with.

LIST OF REFERENCE SIGNS

1 pulp
11 environmentally-friendly, degradable fiber material
2 suction tool
21 suction head
21*a* suction head outside
21*i* suction head inside
21*p* end face of the suction head facing the pulp
21*s* suction head suction side
22 porous strainer of the suction head
22*p* pulp-facing side (pulp side) of the screen
22*s* side of the screen facing the suction side surface 23*s*
22*w* wave crests on the side 22*s* of the screen
22*t* wave troughs of the screen
23 suction channels in the suction head
23*s* suction-side surface of the suction head
24 collecting ring in the suction head
25 discharge channel for the liquid solution
26 base plate of the suction tool
27 gas line system in the base plate
27*d* compressed gas line in the gas line system
27*h* main gas line in the gas line system
27*n* secondary gas line in the gas line system
27*v* valves in the gas line system
28 reversible fastening means for the screen, e.g., clamping means
29 modules with suction heads
3 prepressing station
31 prepressing lower tool
31*a* pressing surface of the prepressing lower tool
33 cavity in prepressing lower tool
34 wall as the pressing surface of the prepressing lower tool
37 carrier plate
36 heating element of the carrier plate
4 movement unit
4*a* robotic arm that can move freely in space
4*s* interface
41 hot-pressing lower tool of the hot-pressing station
41*a* hot-pressing side of the hot-pressing lower tool, e.g., the outside
41*k* channels in the hot-pressing lower tool
42 hot-pressing upper tool of the hot-pressing station
42*a* hot-pressing side of the hot-pressing upper tool, e.g., the inside
43 heating cartridges
44 thermally insulating covering or material
45 carrier plates for the respective hot-pressing lower tool and hot-pressing upper tool designed as a multi-tool
46 bracket
47 expansion means
5 vacuum pump
6 reservoir of pulp
10 formed part made from environmentally-friendly, degradable fiber material
10*a* inner contour (inside) of the formed part
10*i* outer contour (outside) of the formed part
20 molding station
30 preforming station
35 pulp preparation and replenishment unit
40 hot-pressing station
40*i* inner tool
40*a* outer tool
50 control unit
60 coating unit
70 ejection unit
80 cutting unit
90 stacking unit
95 conveyor belt
100 fiber-forming system
200 process for the production of formed parts from environmentally-friendly-degradable fiber material by means of a fiber-forming process in a fiber-forming system
210 molding of the formed part in a molding station
220 preforming of the formed part in a preforming station
230 final shaping of the formed part in a hot-pressing station
240 ejecting of the final-shaped formed part
A-B cutting line in FIG. 5
GD gas pressure
HD hot-pressing pressure
SD suction pressure (pulp against suction head)

SR closing direction (pressing direction) of the hot-pressing station
VD prepressing pressure
150 Frame
250 Pulp tank
300 Supply units
310 Control unit
320 Suction device
400 Pre-pressing station
402 Tool body
404 Feed channel
410 Prepress mold
420 Mold body
422 Material
424 Floor section
426 Wall section
428 Opening
430 Connection section
432 Channel
434 Ring
436 Edge
440 Support structure
442 Receptacle
444 Connector
445 Connection
446 Channel
448 Channel
449 Threaded hole
450 Screw
500 Robot
520 Suction tool
522 Suction cavity
524 Channel
526 Tool body
530 Mold cavity
600 Hot pressing station
610 Hot pressing device
700 HMI Panel
800 Conveying device
810 Camera
1000 Fiber processing device
3000 Cup
$R_a$ Outer radius
$R_i$ Inner radius
H Height At this point it should be explicitly pointed out that features of the solutions described above or in the claims and/or figures can also be combined if necessary in order to be able to implement or achieve the features, effects and advantages explained in a cumulative manner.

It goes without saying that the exemplary embodiment explained above is merely a first embodiment of the present disclosure. In this respect, the design of disclosed embodiments is not limited to this exemplary embodiment.

What is claimed is:

1. A mold body for a pre-pressing tool for pressing three-dimensional preforms made of a fiber-containing material, wherein the mold body includes a deformable material coupled to a support structure of the pre-pressing tool, wherein the deformable material is perforated at least in portions, wherein the mold body has a connection section coupled to the support structure, a floor section distal from the support structure, and wall sections between the connection section and the floor section, and wherein the mold body has a greater material thickness in the connection section than the floor section and the wall sections.

2. The mold body according to claim 1, wherein the connection section of the mold body extends in an edge section for accommodating an edge of a preform.

3. The mold body according to claim 1, wherein the mold body has an integrated connection unit in the connection section for connecting to the support structure.

4. The mold body according to claim 3, wherein the connection unit includes a metal or a metal alloy.

5. The mold body according to claim 3, wherein the connection unit has at least one connection element.

6. The mold body according to claim 5, wherein the at least one connection element is or has a groove, threaded hole, pin, screw, or latching opening.

7. The mold body according to claim 1, wherein the connection section has integrated edge ventilation for an edge of the preforms.

8. The mold body according to claim 1, wherein the mold body substantially images a geometry of a preform on an outer surface.

9. The mold body according to claim 1, wherein the mold body has substantially a same wall thickness in the wall sections and the floor section.

10. The mold body according to claim 1, wherein the mold body has a larger radius at an inner surface in transitions from the wall sections to the floor section than at a corresponding transition at an outer surface.

11. The mold body according to claim 1, wherein the mold body has a reduced material thickness at an inner surface in transitions from the wall sections to the floor section.

12. The mold body according to claim 1, wherein the mold body is concave in the wall and/or floor sections.

13. The mold body according to claim 1, wherein the mold body includes silicone.

14. A pre-pressing tool having at least one mold body for pressing three-dimensional preforms made of a fiber-containing material, wherein the at least one mold body includes a deformable material coupled to a support structure of the pre-pressing tool, wherein the deformable material is perforated at least in portions, wherein the at least one mold body has a connection section coupled to the support structure, a floor section distal from the support structure, and wall sections between the connection section and the floor section, wherein the at least one mold body has a greater material thickness in the connection section than the floor section and the wall sections, wherein the preforms have a moisture content of at least 50 wt. %, the pre-pressing tool having a first tool component having the support structure for the at least one mold body and a second tool component having a corresponding cavity, wherein, in a closed state of the pre-pressing tool, a mold cavity for pressing preforms is formed between an outer surface of the at least one mold body and an inner wall of the corresponding cavity.

15. The pre-pressing tool according to claim 14, wherein the at least one support structure has at least one channel via which a gas or gas mixture is configured to be introduced between a surface of the at least one support structure and an inner surface of the at least one mold body in order to deform the support structure and press a preform introduced into the mold cavity against the inner wall of the corresponding cavity via the outer surface of the at least one mold body.

16. The pre-pressing tool according to claim 14, wherein the mold cavity has openings for discharging water that escapes from preforms during a pre-pressing process.

17. The pre-pressing tool according to claim 14, wherein the at least one mold body is detachably connected to a tool plate of the first tool component.

18. The pre-pressing tool according to claim 14, wherein the at least one mold body has a portion that immerses in the mold cavity in the connection section, which immersing portion is not used for pressing and, when immersing, causes fiber-containing material to push together in edge sections of the preforms.

19. The pre-pressing tool according to claim 18, wherein a height of the immersing portion is at least twice as great as a material thickness of the at least one mold body in a wall or base section.

20. The pre-pressing tool according to claim 14, wherein the support structure for the at least one mold body is replaceably connected to a tool plate of the first tool component.

* * * * *